United States Patent
Zhao et al.

(10) Patent No.: US 10,116,953 B2
(45) Date of Patent: Oct. 30, 2018

(54) DECODING A PICTURE BASED ON A REFERENCE PICTURE SET ON AN ELECTRONIC DEVICE

(71) Applicant: Huawei Technologies Co., Ltd., Shenzhen (CN)

(72) Inventors: Jie Zhao, Vancouver, WA (US); Christopher A. Segall, Camas, WA (US); Sachin G. Deshpande, Vancouver, WA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 11 days.

(21) Appl. No.: 15/376,247

(22) Filed: Dec. 12, 2016

(65) Prior Publication Data
US 2017/0094270 A1 Mar. 30, 2017

Related U.S. Application Data

(63) Continuation of application No. 14/490,965, filed on Sep. 19, 2014, now Pat. No. 9,560,360, which is a
(Continued)

(51) Int. Cl.
*G06K 9/36* (2006.01)
*H04N 19/44* (2014.01)
(Continued)

(52) U.S. Cl.
CPC ........... *H04N 19/44* (2014.11); *H04N 19/105* (2014.11); *H04N 19/159* (2014.11);
(Continued)

(58) Field of Classification Search
CPC .................................. H04N 1/00; H04N 19/00
(Continued)

(56) References Cited

U.S. PATENT DOCUMENTS 6,049,570 A * 4/2000 Fukunaga ............ H04N 19/172
348/439.1
6,111,915 A * 8/2000 Fukunaga .............. H04N 19/61
375/240.12
(Continued)

FOREIGN PATENT DOCUMENTS

CN 101137065 A 3/2008
CN 101222640 A 7/2008
(Continued)

OTHER PUBLICATIONS

Cheung et al., "Reference picture selection in an already MPEG encoded bitstream," in Proc. ICIP 2005, 2005 International Conference on Image Processing, Genova, Italy, v.1, pp. 793-796 (Sep. 11-14, 2005).
(Continued)

*Primary Examiner* — Abolfazl Tabatabai
(74) *Attorney, Agent, or Firm* — Leydig, Voit & Mayer, Ltd.

(57) ABSTRACT

A method for decoding a picture on an electronic device is described. The method includes obtaining a bitstream. The method also includes obtaining a current picture. The method further includes obtaining a relative reference picture set (RPS) parameter. The method additionally includes initializing an index value. Furthermore, the method includes processing another RPS parameter based on the index value. The method also includes decoding the current picture.

8 Claims, 16 Drawing Sheets

Related U.S. Application Data continuation of application No. 13/355,472, filed on Jan. 20, 2012, now Pat. No. 8,867,852, which is a continuation-in-part of application No. 13/354,277, filed on Jan. 19, 2012, now Pat. No. 8,693,793.

(51) Int. Cl.

| | | |
|---|---|---|
| *H04N 19/105* | (2014.01) | |
| *H04N 19/70* | (2014.01) | |
| *H04N 19/172* | (2014.01) | |
| *H04N 19/164* | (2014.01) | |
| *H04N 19/174* | (2014.01) | |
| *H04N 19/65* | (2014.01) | |
| *H04N 19/503* | (2014.01) | |
| *H04N 19/423* | (2014.01) | |
| *H04N 19/58* | (2014.01) | |
| *H04N 19/159* | (2014.01) | |
| *H04N 19/46* | (2014.01) | |
| *H04B 1/66* | (2006.01) | |
| *H04N 19/176* | (2014.01) | |
| *H04N 19/184* | (2014.01) | |

(52) U.S. Cl.
CPC ......... *H04N 19/164* (2014.11); *H04N 19/172* (2014.11); *H04N 19/174* (2014.11); *H04N 19/423* (2014.11); *H04N 19/46* (2014.11); *H04N 19/503* (2014.11); *H04N 19/58* (2014.11); *H04N 19/65* (2014.11); *H04N 19/70* (2014.11); *H04N 19/176* (2014.11); *H04N 19/184* (2014.11)

(58) Field of Classification Search
USPC ........ 382/100, 232, 233; 375/262, 265, 341; 712/208, 209, 210, 21, 212, 213
See application file for complete search history.

(56) References Cited

U.S. PATENT DOCUMENTS

| | | | |
|---|---|---|---|
| 6,400,768 B1 * | 6/2002 | Nagumo | H04N 19/105 375/240.11 |
| 6,530,055 B1 | 3/2003 | Fukunaga | |
| 6,683,988 B1 | 1/2004 | Fukunaga et al. | |
| 8,165,216 B2 | 4/2012 | Chen et al. | |
| 8,396,121 B2 | 3/2013 | Chen et al. | |
| 8,451,895 B2 | 5/2013 | Vetro et al. | |
| 8,805,098 B2 | 8/2014 | Deshpande | |
| 8,867,852 B2 | 10/2014 | Zhao | |
| 9,210,430 B2 | 12/2015 | Deshpande | |
| 9,538,186 B2 | 1/2017 | Zhao et al. | |
| 2001/0007575 A1 | 7/2001 | Mori et al. | |
| 2002/0011997 A1 | 1/2002 | Sotoda et al. | |
| 2007/0019724 A1 | 1/2007 | Tourapis et al. | |
| 2007/0121722 A1 | 5/2007 | Martinian et al. | |
| 2007/0147502 A1 | 6/2007 | Nakamura | |
| 2008/0063072 A1 | 3/2008 | Suzuki | |
| 2008/0165864 A1 | 7/2008 | Eleftheriadis et al. | |
| 2010/0034258 A1 | 2/2010 | Pandit | |
| 2010/0046922 A1 | 2/2010 | Toma et al. | |
| 2010/0091885 A1 | 4/2010 | Jeon et al. | |
| 2010/0118944 A1 | 5/2010 | Tanaka et al. | |
| 2010/0202521 A1 | 8/2010 | Koo et al. | |
| 2010/0246680 A1 | 9/2010 | Tian et al. | |
| 2010/0322311 A1 | 12/2010 | Vetro et al. | |
| 2012/0269275 A1 | 10/2012 | Hannuksela | |
| 2013/0077679 A1 | 3/2013 | Wang et al. | |
| 2013/0188882 A1 | 7/2013 | Zhao | |
| 2013/0202035 A1 | 8/2013 | Chen et al. | |
| 2013/0272372 A1 | 10/2013 | Hannuksela et al. | |
| 2014/0086324 A1 | 3/2014 | Ramasubramonian | |
| 2014/0218473 A1 | 8/2014 | Hannuksela et al. | |
| 2015/0003527 A1 | 1/2015 | Zhao | |

FOREIGN PATENT DOCUMENTS

| | | |
|---|---|---|
| CN | 101637028 A | 1/2010 |
| CN | 102088609 A | 6/2011 |
| EP | 2192778 A1 | 6/2010 |
| WO | WO 2013108641 A1 | 7/2013 |

OTHER PUBLICATIONS

Girod et al., "Feedback-based error control for mobile video transmission," in Proc. IEEE, vol. 87, Issue 10, pp. 1707-1723 (Oct. 1999).

Fukunaga et al., "Error resilient video coding by dynamic replacing of reference pictures," in proc. IEEE Global Telecomm. Conf., vol. 3, pp. 1503-1508 (Nov. 1996).

Tomita et al., "Error resilient modified inter-frame coding system for limited reference picture memories," in Proc. Int. Picture Coding Symposium, pp. 743-748 (Sep. 1997).

Wahadaniah et al., "AHG21: Construction and modification of predefined reference picture sets and reference pictures lists," Joint Collaborative Team on Video Coding (JCT-VC) of ITU-T SG16 WP3 and ISO/IEC JTC1/SC29/WG11, JCTVC-G548 (Nov. 21-30, 2011).

Sjoberg et al., "AHG21: Long-term pictures and pruning of reference picture sets," Joint Collaborative Team on Video Coding (JCT-VC) of ITU-T SG16 WP3 and ISO/IEC JTC1/SC29/WG11, JCTVC-G637 (Nov. 21-30, 2011).

Misra et al., "AHG21: On picture referencing," Joint Collaborative Team on Video Coding (JCT-VC) of ITU-T SG16 WP3 and ISO/IEC JTC1/SC29/WG11, JCTVC-G714 (Nov. 21-30, 2011).

Ramasubramonian,"Simplification of inter-RPS prediction," Joint Collaborative Team on Video Coding (JCT-VC) of ITU-T SG16 WP3 and ISO/IEC JTC1/SC29/WG11, JCTVC-I0347r1 (Apr. 27-May 7, 2012).

Strom, "Inter-RPS complexity reduction," Joint Collaborative Team on Video Coding (JCT-VC) of ITU-T SG16 WP3 and ISO/IEC JTC1/SC29/WG11, JCTVC-J0234 (Jul. 11-20, 2012).

Boyce, "JCT-VC break-out report: Reference picture buffering and list construction (AHG21)", Joint Collaborative Team on Video Coding (JCT-VC) of ITU-T SG16 WP3 and ISO/IEC JTC1/SC29/WG11, JCTVC-G1002 (Nov. 21-30, 2011).

Bross, "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d5 (Jul. 14-22, 2011).

Wang, "Common conditions for reference picture marking and list construction proposals", Joint Collaborative Team on Video Coding (JCT-VC) of ITU-T SG16 WP3 and ISO/IEC JTC1/SC29/WG11, JCTVC-G1036d03 (Nov. 21-30, 2011).

Bross, "High efficiency video coding (HEVC) text specification draft 8", Joint Collaborative Team on Video Coding (JCT-VC) of ITU-T SG16 WP3 and ISO/IEC JTC1/SC29/WG11, JCTVC-J1003_d0 (Jul. 11-20, 2012).

Sjoberg et al., "Absolute signaling of reference pictures," Joint Collaborative Team on Video Coding (JCT-VC) of ITU-T SG16 WP3 and ISO/IEC JTC1/SC29/WG11, JCTVC-F493, 6$^{th}$ Meeting: Torino, Italy (2011).

Bossen, "Common test conditions and software reference configurations," Joint Collaborative Team on Video Coding (JCT-VC) of ITU-T SG16 WP3 and ISO/IEC JTC1/SC29/WG11, JCTVD-F900, 6$^{th}$ Meeting: Torino, Italy (Jul. 2011).

Sjoberg et al., "JCT-VC AHG report: Reference picture buffering and list construction (AHG21)," Joint Collaborative Team on Video Coding (JCT-VC) of ITU-T SG16 WP3 and ISO/IEC JTC1/SC29/WG11, JCTVC-G021, 7$^{th}$ Meeting: Geneva, Switzerland (Nov. 2011).

Tan, "AHG21: Inter reference picture set prediction syntax and semantics," Joint Collaborative Team on Video Coding (JCT-VC) of ITU-T SG16 WP3 and ISO/IEC JTC1/SC29/WG11, JCTVC-G198r2, 7$^{th}$ Meeting: Geneva, Switzerland (Nov. 21-30, 2011).

Bross, "WD5: Working Draft 5 of High-Efficiency Video Coding", Joint Collaborative Team on Video Coding (JCT-VC) of ITU-T

(56) References Cited

OTHER PUBLICATIONS

SG16 WP3 and ISO/IEC JTC1/SC29/WG11, JCTVC-G1103_d0, 7th: Geneva, Switzerland (Nov. 21-30, 2011).
Deshpande et al., "AHG21: Reference Picture Set Signaling Method," Joint Collaborative Team on Video Coding (JCT-VC) of ITU-T SG16 WP3 and ISO/IEC JTC1/SC29/WG11, JCTVC-H0433, 8th Meeting: San Jose, California (Feb. 1-10, 2012).
Deshpande, "On Reference Picture Set Extension," Joint Collaborative Team on Video Coding (JCT-VC) of ITU-T SG16 WP3 and ISO/IEC JTC1/SC29/WG11, JCTVC-K0222, 11th Meeting: Shanghai, China (Oct. 1-19, 2012).
Bross et al., "High Efficiency Video Coding (HEVC) text specification draft 10 (for FDIS & Last Call)," Joint Collaborative Team on Video Coding (JCT-VC) of ITU-T SG 16 WP 3 and ISO/IEC JTC 1/SC 29/WG 11, JCTVC-L1003_v34, 12th Meeting: Geneva, Switzerland (Jan. 14-23, 2013).
Hannuksela et al., "HEVC v1 scalability hook: long-term pictures with layer_id values," Joint Collaborative Team on Video Coding (JCT-VC) of ITU-T SG 16 WP 3 and ISO/IEC JTC 1/SC 29/WG 11, 12th Meeting, Geneva, Switzerland, Document JCTVC-L0170 (Jan. 14-23, 2013).
Deshpande, "Comments on SHVC and MV-HEVC," Joint Collaborative Team on 3D Video Coding Extensions of ITU-T SG 16 WP 3 and ISO/IEC JTC 1/SC 29/WG 11, 4th Meeting, Incheon, Korea, Document JCT3V-D0081, WG11 No. m28909 (Apr. 20-26, 2013).
Hannuksela, "MV-HEVC/SHVC HLS: Reference picture set/list derivation independent of ViewId," Joint Collaborative Team on Video Coding (JCT-VC) of ITU-T SG 16 WP 3 and ISO/IEC JTC 1/SC 29/WG 11, 15th Meeting, Geneva, Switzerland, Document JCTVC-O0174 (Oct. 23-Nov. 1, 2013).
Hendry et al., "Random Access Detection and Notification," Joint Collaborative Team on Video Coding (JCT-VC) of ITU-T SG16 WP3 and ISO/IEC JTC1/SC29/WG11, JCTVC-G159, 7th Meeting: Geneva, Switzerland (Nov. 21-30, 2011).
Tan, "JCTVC-G198 Inter RPS Prediction," 7th JCTVC Meeting, NTT DoCoMo, Inc., Chiyoda, Japan, PowerPoint (Nov. 2011).
Bross, "High efficiency video coding (HEVC) text specification draft 6", Joint Collaborative Team on Video Coding (JCT-VC) of ITU-T SG16 WP3 and ISO/IEC JTC1/SC29/WG11, JCTVC-H1003, (Feb. 1-10, 2012).

\* cited by examiner

DECODING A PICTURE BASED ON A REFERENCE PICTURE SET ON AN ELECTRONIC DEVICE

CROSS-REFERENCE TO RELATED APPLICATIONS

This application is a continuation of U.S. patent application Ser. No. 14/490,965, filed on Sep. 19, 2014, which is a continuation of U.S. patent application Ser. No. 13/355,472, filed on Jan. 20, 2012, now U.S. Pat. No. 8,867,852, which is a continuation-in-part of U.S. patent application Ser. No. 13/354,277, filed on Jan. 19, 2012. All of the aforementioned applications are hereby incorporated by reference in their entireties.

TECHNICAL FIELD

The present disclosure relates generally to electronic devices. More specifically, the present disclosure relates to decoding a picture based on a reference picture set on an electronic device.

BACKGROUND

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and playback presents several challenges. As can be observed from this discussion, systems and methods that represent digital media more efficiently may be beneficial.

DETAILED DESCRIPTION

Figure 1:
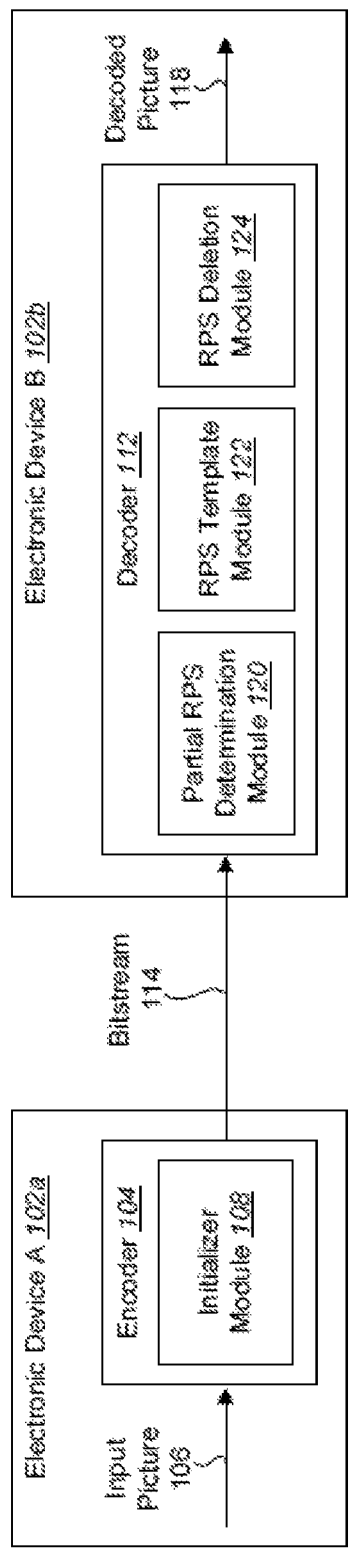
FIG. 1 is a block diagram illustrating an example of one or more electronic devices in which systems and methods for reducing reference picture set (RPS) signal overhead may be implemented.

A method for decoding a picture on an electronic device is described. The method includes obtaining a bitstream. The method also includes obtaining a current picture. The method further includes obtaining a relative reference picture set (RPS) parameter. The method additionally includes initializing an index value. Furthermore, the method includes processing another RPS parameter based on the index value. The method also includes decoding the current picture.

The relative RPS parameter may be a negative relative RPS parameter and the other RPS parameter may be a positive RPS parameter. Initializing the index value may be based on the relative negative RPS parameter. The index value may be initialized to an absolute value of a smallest RPS parameter.

The method may also include obtaining a symmetric flag. The symmetric flag may indicate that the relative negative RPS parameter corresponds to the positive RPS parameter. Initializing the index value may be based on the relative negative RPS parameter and the symmetric flag. The index value may be initialized to the absolute value of a smallest RPS parameter.

Processing the positive RPS parameter may include skipping processing of at least one positive RPS parameter when the index value may be initialized. Processing the positive RPS parameter may include generating the positive RPS parameter.

The negative RPS parameter may be obtained from a picture parameter set (PPS). The relative RPS parameter may be a positive relative RPS parameter and the other RPS parameter may be a negative RPS parameter.

An electronic device configured for decoding a picture is also described. The electronic device includes a processor and executable instructions stored in memory that is in electronic communication with the processor. The electronic device obtains a bitstream. The electronic device additionally obtains a current picture. The electronic device further obtains a relative reference picture set (RPS) parameter. The electronic device also initializes an index value. Furthermore, the electronic device processes another RPS parameter based on the index value. The electronic device also decodes the current picture.

The systems and methods disclosed herein describe several configurations for reducing reference picture set (RPS) signal overhead on an electronic device. For example, the systems and methods disclosed herein describe encoding and decoding an RPS. For instance, several approaches for decoding an RPS are described. Additionally, approaches for encoding an RPS to achieve reduced signal overhead are also described.

A RPS is a set of reference pictures associated with a picture. An RPS may include reference pictures that are prior to the associated picture in decoding order that may be used for inter prediction of the associated picture and/or for any picture following the associated picture in decoding order. An RPS describes one or more reference pictures in the decoded picture buffer (DPB). This is accomplished in the slice header of each picture. Previous video coding standards, such as H.264/AVC referenced reference pictures in a relative manner. Any pictures in the DPB that are not a part of the reference picture set may be marked as "unused for reference."

A DPB may be used to store reconstructed (e.g., decoded) pictures at a decoder. These stored pictures may then be used, for example, in an inter-prediction mechanism. When pictures are decoded out of order, the pictures may be stored in the DPB so they can be displayed later in order. Also, a picture in the DPB may be associated with a picture order count (POC). The POC may be a variable that is associated with each encoded picture and that has a value that increases with increasing picture position in an output order. In other words, the POC may be used by the decoder to deliver the pictures in the correct order for display. The POC may also be used for identification of reference pictures during reference picture list construction and decoded reference picture marking.

In some configurations, reference pictures are referenced using either relative (e.g., delta) referencing (using a deltaPOC and a currentPOC, for example) or absolute referencing (using the POC, for example). For instance, the DPB may contain a set of received pictures. A subset of these received pictures may use relative (e.g., delta) referencing and the remaining received pictures may use absolute referencing. It should be noted that one or more of the configurations of buffer descriptions and syntaxes described herein may be implemented in combination with one or more of the approaches (e.g., methods) described herein.

A RPS may contain a list of information of all reference pictures that the decoder shall keep. For example, this information may be stored as a set of indexes called deltaPOCs. A deltaPOC may be used to calculate the POC of a reference picture. For instance, POC_reference=POC_current+deltaPOC. In other words, by using the current POC of the picture to be decoded and the deltaPOC of a reference picture, the reference picture may be located in a relative manner. Additionally an RPS may store a temporal ID for each reference picture and/or a flag which indicates if the particular reference picture is used by the current picture.

An example of how an RPS works at on an electronic device follows. Suppose an Inter-frame (I-frame) picture is received followed two bidirectional predicted (B-frame) pictures, then followed by two bidirectional predicted (b-frame) pictures. A B-frame is a bidirectional predicted picture that is used for prediction by other pictures. A b-frame is a bidirectional predicted picture that is not used for prediction by other pictures.

In other words, the order of receiving the pictures is $I_0$-$B_1$-$B_2$-$b_1$-$b_2$. In this example, the GOP size is 4.

Further suppose that the I-frame has a POC of 0, the first received b-frame has a POC of 1, the second received B-frame has a POC of 2, the first received b-frame has a POC of 3 and the first received B-frame has a POC of 4. In other words, the POC order is $I_0$-$b_1$-$B_2$-$b_2$-$B_1$. Additionally, suppose that the I-frame serves as a reference picture for $B_1$, $B_2$ and $b_1$; $B_1$ serves as a reference picture for $B_2$, and $b_2$; and $B_2$ serves as a reference picture for $b_1$ and $b_2$.

In this example, the second picture in decoding order (e.g., picture $B_1$/POC 4) will include picture of POC 0 (e.g., $I_0$) in its RPS. To store $I_0$/POC 0, B1 may write deltaPOC=−4 into its RPS index value. In other words, the difference of the reference POC relative to current POC is stored in the RPS as an index value.

The third picture in decoding order (i.e., picture $B_2$/POC 2) will include pictures of POC 0 and POC 4 (e.g., $B_1$) in its RPS. Thus, the index values of deltaPOC=−2 and 2 are stored in its RPS.

Continuing the example, the fourth picture in decoding order (i.e., picture $b_2$/POC 1) may include both pictures of POC 0 (e.g., $I_0$) and POC 2 (e.g., $B_2$) in its RPS. Further, $b_2$/POC 1 may also include POC 4 (e.g., $B_1$) since that picture will be used for reference in the future. Here, deltaPOCs −1, 1, 3 are stored in its RPS. It should be noted that both positive and negative deltaPOCs may be stored in an RPS.

Finishing this example, the 5th picture in decoding order ((i.e., picture $b_1$/POC 3) may include pictures of POC 2 (e.g., $B_2$) and POC 4 (e.g., $B_1$) in its RPS. Thus, deltaPOC=−1 and 1 are the relative values stored in $b_1$'s RPS as index values. It may also be noted that $b_1$ does not need to include POC 0 (e.g., $I_0$) in its RPS unless $I_0$ is going to be used for reference in the future. If POC 0 (e.g., $I_0$) is not included in the RPS of the $b_1$, it may be marked as "unused for reference."

Once an RPS has been listed and constructed, it is ready to be signaled. There are various ways to signal an RPS. According to one approach, a set of templates associated with handling RPSs are signaled in the picture parameter set (PPS) and referred to by each slice with an RPS index in a slice header. Under another method, an RPS may be signaled explicitly in a slice header.

Listing (1) below shows one example of syntax for signaling the RPS in the PPS.

Listing (1)

```
/*  Reference picture set syntax for when the RPS is signaled in the PPS
/*  Descriptors used in all listings:
    ue(v): Unsigned integer, entropy coded variable length
    u(x): Unsigned x-bit(s) integer
*/
pic_parameter_set ( ) {
    pic_parameter_set_id
    seq_paramater_set_id
    entropy_coding_mode_flag
    num_ref_pic_sets
    for(idx=0; idx < num_ref_pic_sets_idx++)
        ref_pic_set(idx)
    ...
}
ref_pic_set(idx){
    num_negative_pics
    num_positive_pics
```

-continued

Listing (1)

```
for(i = 0; i < num_negative_pics; i++){
    delta_poc_s0_minus1[i]
    used_by_curr_pic_s0_flag[i]
}
for(i = 0; i < num_positive_pics; i++){
    delta_poc_s1_minus1[i]
    used_by_curr_pic_s1_flag[i]
}
}
``` partial_ref_pic_set_flag[i] indicates to use full RPS[i] to generate a partial RPS. Ref_flag specifies which reference index of the full RPS[i] is copied into the partial RPS.

seq_parameter_set_id identifies the sequence parameter set that is referred to by the picture parameter set. The value of seq_parameter_set_id shall be in the range of 0 to 31, inclusive.

pic_parameter_set_id identifies the picture parameter set that is referred to in the slice header. The value of pic_parameter_set_id shall be in the range of 0 to 255, inclusive. entropy_coding_mode_flag indicates the entropy decoding method to be applied for the syntax elements.

num_ref_pic_sets specifies the number of reference picture sets that are specified in the picture parameter set. num_negative_pics specifies the number of the following delta_poc_s0_minus1[i] and used_by_curr_pic_s0_flag[i] syntax elements. num_positive_pics specifies the number of the following delta_poc_s1_minus1[i] and used_by_curr_pic_s1_flag1[i] syntax elements. delta_poc_s0_minus1[i] plus 1 specifies an absolute difference between two picture order count values.

used_by_curr_pic_s0_flag[i] equal to 0 specifies that the $i^{th}$ reference picture that has picture order count less than that of the current picture is not used for reference by the current picture. delta_poc_s1_minus1[i] plus 1 specifies an absolute difference between two picture order count values. used_by_curr_pic_s1_flag[i] equal to 0 specifies that the $i^{th}$ reference picture that has picture order count greater than that of the current picture is not used for reference by the current picture.

It should be noted that the definitions given for parameters used in Listing (1) may be applied to all listings given herein. Furthermore, parameter definitions be given in subsequent listings may also apply to previously listed listings.

Listing (2) shows one example of syntax for signaling the RPS in a slice header.

Listing (2)

```
/*  Syntax for signaling the RPS in a slice header.
*/
slice_header ( ) {
    ...
    if(IdrPicFlag){
        ...
    }
    else {
        ...
        ref_pic_set_pps_flag
        if(!ref_pic_set_pps_flag)
            ref_pic_set(num_ref_pic_sets)
        else
            ref_pic_set_idx
        ...
    }
}
``` ref_pic_set_pps_flag equal to 1 specifies that the reference picture set of the current picture shall be created using syntax elements in the active picture parameter set. ref_pic_set_pps_flag equal to 0 specifies that the reference picture set of the current picture shall be created using syntax elements in the ref_pic_set( ) syntax structure in the slice header.

ref_pic_set_pps_idx specifies the index to the list of reference picture sets specified in the active picture parameter set that shall be used for creation of the reference picture set of the current picture.

Further, RPS templates may be signaled to a decoder to assist in decoding a picture. Templates may be for a Random Access common test condition where eight pictures are grouped together (e.g., group of pictures (GOP)). Table (1) below shows an RPS template for Random Access common test condition (GOP=8). Some terms have been abbreviated for convenience in Tables (1)-(4). These terms are abbreviated as follows: Temporal_id (TId), ref_buf_size (RBS) and RPS Index Values (RPS Index Values).

TABLE (1)

| RPS # | Type | POC | TId | RBS | ref_pic | #ref_pics | RPS Idx Values |
|---|---|---|---|---|---|---|---|
| 1: | B | 8 | 0 | 4 | 1 | 4 | −8 −10 −12 −16 |
| 2: | B | 4 | 0 | 2 | 1 | 3 | −4 −6 4 |
| 3: | B | 2 | 0 | 2 | 1 | 4 | −2 −4 2 6 |
| 4: | B | 1 | 0 | 2 | 0 | 4 | −1 1 3 7 |
| 5: | B | 3 | 0 | 2 | 0 | 4 | −1 −3 1 5 |
| 6: | B | 6 | 0 | 2 | 1 | 4 | −2 −4 −6 2 |
| 7: | B | 5 | 0 | 2 | 0 | 4 | −1 −5 1 3 |
| 8: | B | 7 | 0 | 2 | 0 | 4 | −1 −3 −7 1 |

In Table (1), Type signifies the type of frame used. In this case, all Frames are B-frames. Note, Frame 0, which is not shown, is an I-frame. In Table (1), Temporal_id (TId) specifies the temporal layer ID of this frame, ref_buf_size (RBS) is the reference buffer size needed by the current picture, ref_pic indicates if the frame is a reference picture for other pictures, #ref_pics is the number of reference pictures and RPS Index Values (RPS Idx Values) represent the index values of the reference pictures stored in each RPS for each corresponding frame.

An additional partial RPS may be generated for frames that have one or more unavailable reference pictures due to instantaneous decoding refresh (IDR) or clean random access (CRA). Table (2) shows a template for a partial RPS generated for a Random Access common test condition.

TABLE (2)

| RPS # | Type | POC | TId | RBS | ref_pic | #ref_pics | RPS Idx Values |
|---|---|---|---|---|---|---|---|
| 1: | B | 8 | 0 | 4 | 1 | 1 | −8 |
| 2: | B | 4 | 0 | 2 | 1 | 2 | −4 4 |
| 3: | B | 2 | 0 | 2 | 1 | 3 | −2 2 6 |

A partial RPS may be created from a full RPS. In Table (1), the RPS index for Frame 1 is −8. −10, −12 and −16. The RPS index for the partial RPS for Frame 1 in Table (2) is only −8. Similarly, Frames 2 and 3 in the partial RPS have a lesser number of reference pictures in Table (2) than in the full RPS shown in Table (1). Thus, in this example, a partial RPS contains fewer RPS index values per frame than a full RPS.

Table (3) shows the template for a Low Delay common test condition, where GOP equals 4.

TABLE (3)

| RPS # | Type | POC | TId | RBS | ref_pic | #ref_pics | RPS Idx Values |
|---|---|---|---|---|---|---|---|
| 1 | B | 1 | 0 | 4 | 1 | 4 | −1 −5 −9 −13 |
| 2 | B | 2 | 0 | 4 | 1 | 4 | −1 −2 −6 −10 |
| 3 | B | 3 | 0 | 4 | 1 | 4 | −1 −3 −7 −11 |
| 4 | B | 4 | 0 | 4 | 1 | 4 | −1 −4 −8 −12 |

In Table (3), each GOP has four pictures. In the template, there are also four RPSs that correspond to pictures at each POC position:

RPS[0], which has index values of [−1, −5, −9, −13] for POC 1;

RPS[1], which has index values of [−1 −2 −6 −10] for POC 2;

RPS[2], which has index values of [−1, −3, −7, −11] for POC 3; and

RPS[3], which has index values of [−1, −4, −8, −12] for POC 4;

for a sequence 0, 1, 2, 3, 4, 5, 6, 7, 8, 9, 10, 11, 12, 13, 14, etc.

Table (4) shows a template for a partial RPS generated for a Low Delay common test condition. Table (4) is a continuation of Table (3).

TABLE (4)

| RPS# | Type | POC | TId | RBS | ref_pic | #ref_pics | RPS Idx Values |
|---|---|---|---|---|---|---|---|
| 5 | B | 1 | 0 | 4 | 1 | 1 | −1 |
| 6 | B | 2 | 0 | 4 | 1 | 2 | −1 −2 |
| 7 | B | 3 | 0 | 4 | 1 | 3 | −1 −2 −3 |
| 8 | B | 4 | 0 | 4 | 1 | 4 | −1 −2 −3 −4 |
| 9 | B | 1 | 0 | 4 | 1 | 4 | −1 −2 −3 −5 |
| 10 | B | 2 | 0 | 4 | 1 | 4 | −1 −2 −3 −6 |
| 11 | B | 3 | 0 | 4 | 1 | 4 | −1 −2 −3 −7 |
| 12 | B | 4 | 0 | 4 | 1 | 4 | −1 −2 −4 −8 |
| 13 | B | 1 | 0 | 4 | 1 | 4 | −1 −2 −5 −9 |

In Table (4), additional index references are generated for frames that have unavailable reference pictures. A reference picture may be unavailable due to IDR or CRA. When generating a partial RPS for the Low Delay common test case, pictures for the first few frames in the GOP after an IDR or CRA are selected. For example, Frames 1 to 4 at start of a sequence belong to the first GOP, it will use partial RPS[5] to RPS[8], which are derived from RPS[0] to RPS[3]. Frames 5 to 8 belong to the second GOP and will use partial RPS[9] to RPS[12,] which are also derived from RPS[0] to RPS[3]. Frames 9 belongs to the third GOP and will use partial RPS[13] which is derived from RPS[0].

In some configurations, the electronic device deriving the partial RPS may employ rules to derive partial the RPS from the full RPS. For example, RPS Numbers 7, 8, 9, 11, 12 and 13 may all add the RPS index value −2 (indicated in bold). Note that this RPS index value is relative and is dependent on the current frame position (e.g., current POC). Further, RPS Numbers 8, 9 and 10 each add the RPS index value of −3 (indicated in bold).

According to known approaches, such as that specified in High Efficiency Video Coding (HEVC) test model (HM) 5.0, both the full RPS and partial RPS are signaled in the bitstream. For example, RPS templates, including a full RPS and a partial RPS are sent in a PPS at the start of picture. This leads to unnecessary overhead being sent in the bitstream. This overhead of signaling RPS templates in PPS may be from several hundred to several thousands of bits, for example. Further, extra and unnecessary work is also performed at the encoder to generate a partial RPS. Thus, one of the benefits on the systems and methods disclosed herein is that RPS signaling overhead is reduced by generating partial RPS templates at the decoder side based on a received full RPS.

Also, according to known approaches, such as that specified in HM5.0, within one RPS, reference picture indexes are differentially coded among the negative indexes and among the positive indexes. Thus, it may be beneficial to reduce the number of signaled bits by employing the systems and methods disclosed herein to reduce the number bits for an RPS template. For example, this may be accomplished by reducing the number of bits required to code a list of RPS index values.

The systems and methods disclosed herein may provide one or more additional benefits in reducing RPS signal overhead. In one configuration, symmetry characteristics of positive and negative reference indexes may be employed to reduce the bits used for coding positive RPS index values (e.g., reference indexes). Under another configuration, a partial RPS may be derived at the decoder rather than sending the partial RPS in the bitstream. Additionally or alternatively, frequently used RPS templates at both the encoder and decoder side may be defined, allowing the template to be signaled by a simple index in the PPS. Additionally or alternatively, a partial RPS may be signaled by referring to a full RPS and deleting some of the reference pictures to arrive at the partial RPS.

Various configurations are now described with reference to the FIG.s, where like reference numbers may indicate functionally similar elements. The systems and methods as generally described and illustrated in the FIG.s herein could be arranged and designed in a wide variety of different configurations. Thus, the following more detailed description of several configurations, as represented in the FIG.s, is not intended to limit scope, as claimed, but is merely representative of the systems and methods.

FIG. 1 is a block diagram illustrating an example of one or more electronic devices 102a-b in which systems and methods for reducing RPS signal overhead may be implemented. In this example, electronic device A 102a and electronic device B 102b are illustrated. However, it should be noted that one or more of the features and functionality described in relation to electronic device A 102a and electronic device B 102b may be combined into a single electronic device in some configurations.

Electronic device A 102a includes an encoder 104 and an RPS index initializer module (initializer module) 108. Each of the elements included within electronic device A 102a (e.g., the encoder 104 and the initializer module 108) may be implemented in hardware, software or a combination of both.

Electronic device A 102a may obtain an input picture 106. In some configurations, the input picture 106 may be captured on electronic device A 104a using an image sensor, retrieved from memory and/or received from another electronic device.

The encoder 104 may encode the input picture 106 to produce encoded data. For example, the encoder 104 may encode a series of input pictures 106 (e.g., video). In one configuration, the encoder 104 may be a HEVC encoder. The encoded data may be digital data (e.g., a bitstream). The encoder 104 may generate overhead signaling based on the input signal.

The initializer module 108 may be used in processing RPS index values. For example, the initializer module 108 may initialize values used in the processing of positive reference pictures. This data may be recorded in a PPS and an index to it may be signaled in the slice header of a picture.

More detail on kinds of initializations that may be produced by electronic device A 102a is given below. It should be noted that the initializer module 108 may be included within the encoder 104 in some configurations. The initializer module 108 may enable reduced RPS signaling overhead.

The encoder 104 (and initializer module 108, for example) may produce a bitstream 114. The bitstream 114 may include encoded picture data based on the input picture 106. In some configurations, the bitstream 114 may also include overhead data, such as slice header information, PPS information, etc. More detail on overhead data is given below. As additional input pictures 106 are encoded, the bitstream 114 may include one or more encoded pictures. For instance, the bitstream 114 may include one or more encoded reference pictures and/or other pictures.

The bitstream 114 may be provided to a decoder 112. In one example, the bitstream 114 may be transmitted to electronic device B 102b using a wired or wireless link. In some cases, this may be done over a network, such as the Internet or a Local Area Network (LAN). As illustrated in FIG. 1, the decoder 112 may be implemented on electronic device B 102b separately from the encoder 104 on electronic device A 102a. However, it should be noted that the encoder 104 and decoder 112 may be implemented on the same electronic device in some configurations. In an implementation where the encoder 104 and decoder 112 are implemented on the same electronic device, for instance, the bitstream 114 may be provided over a bus to the decoder 112 or stored in memory for retrieval by the decoder 112.

The decoder 112 may be implemented in hardware, software or a combination of both. In one configuration, the decoder 112 may be a HEVC decoder. The decoder 112 may receive (e.g., obtain) the bitstream 114. The decoder 112 may generate a decoded picture 118 (e.g., one or more decoded pictures 118) based on the bitstream 114. The decoded picture 118 may be displayed, played back, stored in memory and/or transmitted to another device, etc.

The decoder 112 may include a partial RPS determination module 120, an RPS template module 122 and/or an RPS deletion module 124. The partial RPS determination module 120 may enable the decoder 112 to generate a partial RPS at the decoder. For example, partial RPS determination module 120 may generate a partial RPS based on a full RPS received at the decoder 112. The partial RPS determination module 120 is described in greater detail below.

The RPS template module 122 may create an RPS template based on signals received in the bitstream 114. For example the RPS template module 122 may use a GOP size, a coding structure and rules obtained from the bitstream to create a template. The RPS template module 122 is described in greater detail below.

In some configurations, the RPS deletion module 124 may identify missing reference pictures and send feedback to the encoder 104, signaling that one or more reference pictures are missing. The RPS deletion module 124 may obtain instructions in the bitstream to delete one or more pictures in a current or previously received RPS. In other configurations, an RPS deletion instructions may be received without sending feedback to the encoder. The RPS deletion module 124 is described in greater detail below.

In another example, such as a scalable coding scenario, a bitstream may contain pictures of different resolutions. In this example, the reference picture collection may include (e.g., identify) different resolution versions of the same picture.

Figure 2:
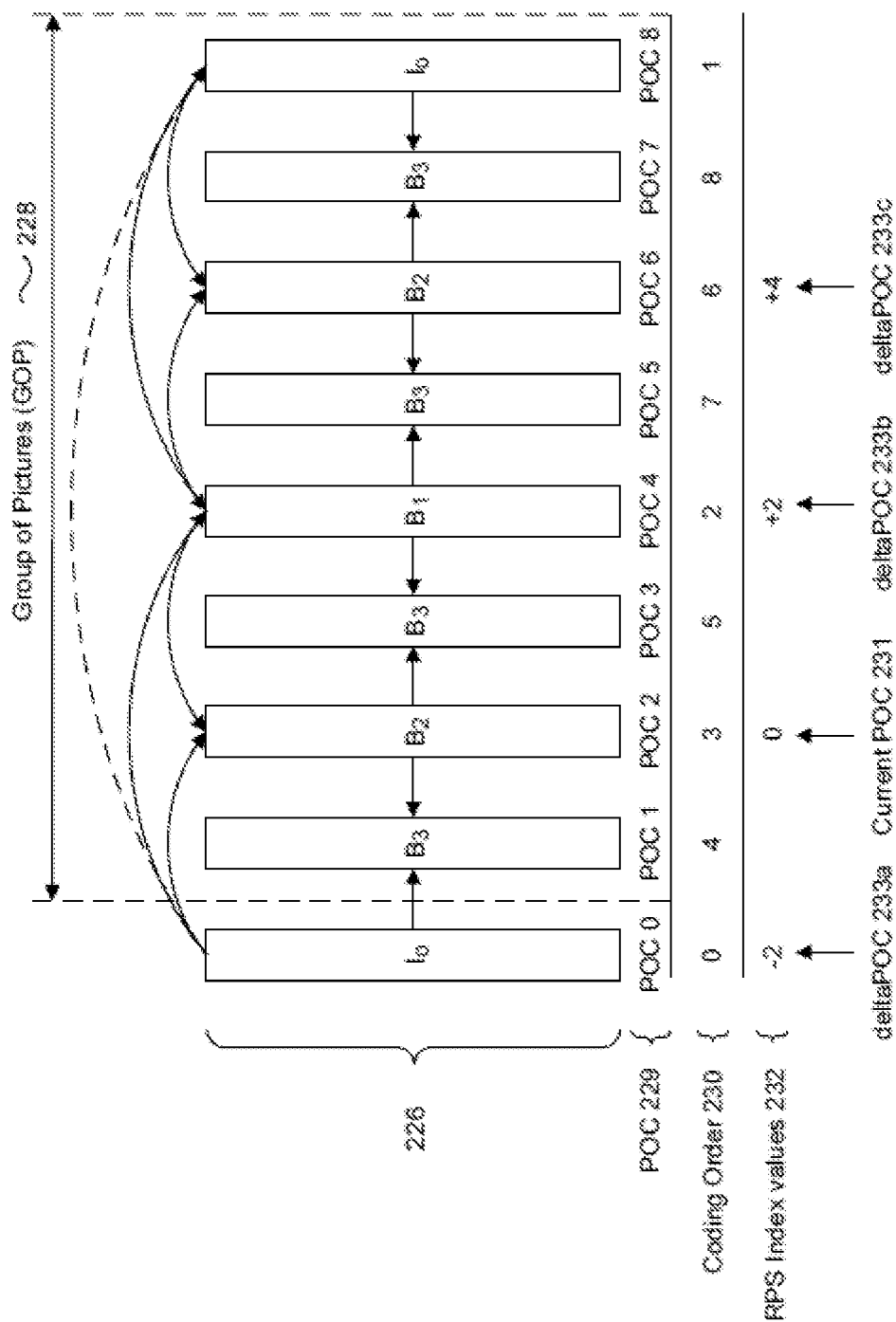
FIG. 2 is a block diagram illustrating one configuration of a group of pictures (GOP)

FIG. 2 is a block diagram illustrating one configuration of a group of pictures (GOP) 228. In some configurations, the GOP 228 may be in a hierarchy coding structure, such as Hierarchy B structure with a coding order of minimum decoding delay. For instance, the GOP 228 may be in a hierarchical prediction structure with four dyadic hierarchy stages. It should be noted that the number of pictures in the GOP 228 may be eight (e.g., GOP size=8) in some configurations, as illustrated in FIG. 2.

FIG. 2 illustrates one or more pictures 226. In some instances, these pictures may be reference pictures. Each picture 226 may belong to a hierarchy stage. For instance, I-frame pictures 226 may have a base hierarchy stage, such as stage 0. In some cases, the I-frames may be an IDR picture. B-frames may have stages of 1, 2 or 3. In some cases, the stages may correspond to temporal scalability. In other words, as the states increase in number, so does the ability to refine the current picture. In this way, a picture 226 with a lower stage can employ higher corresponding pictures 226 to add clarity and refinement.

The GOP 228 may be ordered by display order or a POC 229. However, the coding order 230 or order in which the pictures are obtained from a bitstream may be different from the POC 229 order.

In some configurations, the pictures 226 in a GOP 228 are ordered in a symmetrical hierarchal pattern. In this type of configuration, the smallest distance to a negative reference picture and a positive reference picture may be the same. That is, the absolute value of positive deltaPOC and negative deltaPOC in RPS are usually the same.

For example, suppose POC 2 is the current POC 231 that indicates a current picture to be decoded. To decode the picture indicated by the current POC 231, one or more of the RPS index values 232 must be obtained. In this example, the picture indicated by the current POC 231 uses pictures indicated by POC 2, POC 4 and POC 6 to be decoded. Rather than using absolute values, the current POC 231 uses relative values stored in an RPS to locate reference pictures. In some cases, the RPS is obtained directly from the slice header in a picture 226. In other cases, the RPS is located in the PPS as signaled from the slice header of the corresponding picture 226. Here, current POC 231 obtains the RPS index values of [−2, 2, 4]. That is, current POC 231 employs deltaPOC 233a, deltaPOC 233b and deltaPOC 233c to decode the picture 226.

In this example, where the current POC is POC 2, the symmetrical hierarchy nature of a GOP 228 may be beneficial in reducing the RPS signaling overhead. The current POC 231 that has a negative deltaPOC 233a (e.g., −2) will likely have a corresponding symmetrical positive deltaPOC 233b (e.g., 2). Using this symmetry, approaches for reducing RPS signal overhead can be employed. Various such approaches (e.g., methods) are described in greater detail below in connection with FIGS. 5 and 6.

In another example, assuming that the currentPOC is POC 4, then one RPS index value may be deltaPOC −4. Additionally, POC 4 may also have an index value of deltaPOC=4 in its RPS, which refers to the reference picture POC 8. Further RPS reference pictures for currentPOC=POC 4 may be POC 2 and POC 6. Thus, the RPS index values may be [−4, −2, 2, 4].

In yet another example, assuming that the currentPOC is POC 2, then the RPS may include pictures corresponding to POC 0 and POC 4. Additionally, the index value deltaPOC=6 may be stored in its RPS. This is because the RPS index value of deltaPOC=6 refers to a reference picture that may need to be kept in the decoder since it may be used as a reference picture by future pictures. In other words, RPS index values with positive deltaPOC values indicating one or more pictures may need to be kept in the decoder to serve as reference pictures for a future picture that may need to be decoded.

Figure 3:
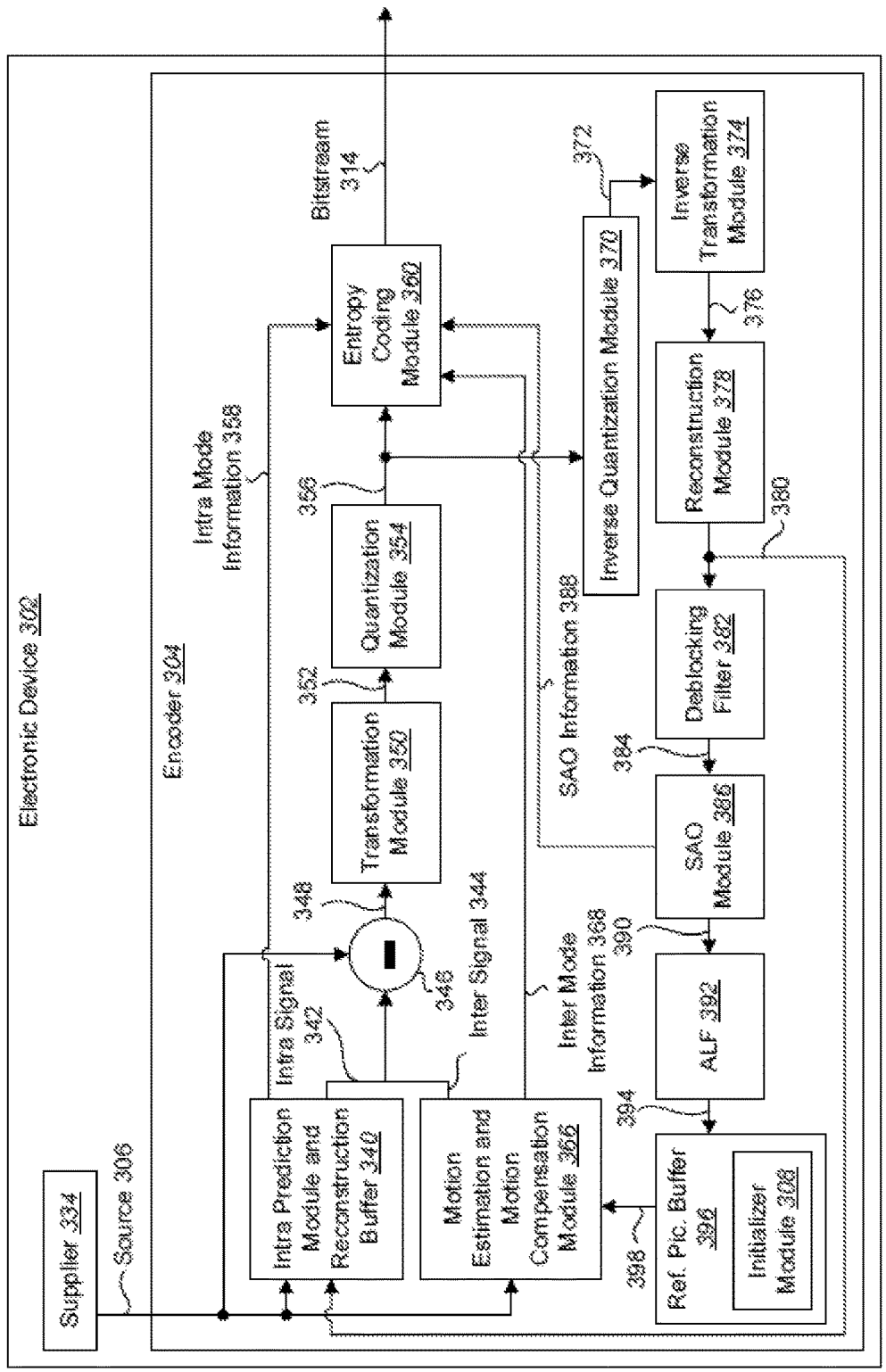
FIG. 3 is a block diagram illustrating one configuration of an encoder on an electronic device.

FIG. 3 is a block diagram illustrating one configuration of an encoder 304 on an electronic device 302. It should be noted that one or more of the elements illustrated as included within the electronic device 302 may be implemented in hardware, software or a combination of both. For example, the electronic device 302 includes an encoder 304, which may be implemented in hardware, software or a combination of both. For instance, the encoder 304 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 304 may be a HEVC coder.

The electronic device 302 may include a supplier 334. The supplier 334 may provide picture or image data (e.g., video) as a source 306 to the encoder 304. Examples of the supplier 334 include image sensors, memory, communication interfaces, network interfaces, wireless receivers, ports, etc.

The source 306 may be provided to an intra-frame prediction module and reconstruction buffer 340. The source 306 may also be provided to a motion estimation and motion compensation module 366 and to a subtraction module 346.

The intra-frame prediction module and reconstruction buffer 340 may generate intra mode information 358 and an intra signal 342 based on the source 306 and reconstructed data 380. The motion estimation and motion compensation module 366 may generate inter mode information 368 and an inter signal 344 based on the source 306 and a reference picture buffer 396 signal 398.

The reference picture buffer 396 signal 398 may include data from one or more reference pictures stored in the reference picture buffer 396. The reference picture buffer 396 may also include an RPS index initializer module 308. The initializer module 308 may process reference pictures 226 corresponding to the buffering and list construction of an RPS.

The encoder 304 may select between the intra signal 342 and the inter signal 344 in accordance with a mode. The intra signal 342 may be used in order to exploit spatial characteristics within a picture in an intra coding mode. The inter signal 344 may be used in order to exploit temporal characteristics between pictures in an inter coding mode. While in the intra coding mode, the intra signal 342 may be provided to the subtraction module 346 and the intra mode information 358 may be provided to an entropy coding module 360. While in the inter coding mode, the inter signal 344 may be provided to the subtraction module 346 and the inter mode information 368 may be provided to the entropy coding module 360.

Either the intra signal 342 or the inter signal 344 (depending on the mode) is subtracted from the source 306 at the subtraction module 346 in order to produce a prediction residual 348. The prediction residual 348 is provided to a transformation module 350. The transformation module 350 may compress the prediction residual 348 to produce a transformed signal 352 that is provided to a quantization module 354. The quantization module 354 quantizes the transformed signal 352 to produce transformed and quantized coefficients (TQCs) 356.

The TQCs 356 are provided to an entropy coding module 360 and an inverse quantization module 370. The inverse quantization module 370 performs inverse quantization on the TQCs 356 to produce an inverse quantized signal 372 that is provided to an inverse transformation module 374. The inverse transformation module 374 decompresses the inverse quantized signal 372 to produce a decompressed signal 376 that is provided to a reconstruction module 378.

The reconstruction module 378 may produce reconstructed data 380 based on the decompressed signal 376. For example, the reconstruction module 378 may reconstruct (modified) pictures. The reconstructed data 380 may be provided to a deblocking filter 382 and to the intra prediction module and reconstruction buffer 340. The deblocking filter 382 may produce a filtered signal 384 based on the reconstructed data 380.

The filtered signal 384 may be provided to a sample adaptive offset (SAO) module 386. The SAO module 386 may produce SAO information 388 that is provided to the entropy coding module 360 and an SAO signal 390 that is provided to an adaptive loop filter (ALF) 392. The ALF 392 produces an ALF signal 394 that is provided to the reference picture buffer 396. The ALF signal 394 may include data from one or more pictures that may be used as reference pictures.

The entropy coding module 360 may code the TQCs 356 to produce a bitstream 314. Also, the entropy coding module 360 may code the TQCs 356 using Context-Adaptive Variable Length Coding (CAVLC) or Context-Adaptive Binary Arithmetic Coding (CABAC). In particular, the entropy coding module 360 may code the TQCs 356 based on one or more of intra mode information 358, inter mode information 368 and SAO information 388. The bitstream 314 may include coded picture data.

Quantization, involved in video compression such as HEVC, is a lossy compression technique achieved by compressing a range of values to a single quantum value. The quantization parameter (QP) is a predefined scaling parameter used to perform the quantization based on both the quality of reconstructed video and compression ratio. The block type is defined in HEVC to represent the characteristics of a given block based on the block size and its color information. QP, resolution information and block type may be determined before entropy coding. For example, the electronic device 302 (e.g., the encoder 304) may determine the QP, resolution information and block type, which may be provided to the entropy coding module 360.

The entropy coding module 360 may determine the block size based on a block of TQCs 356. For example, block size may be the number of TQCs 356 along one dimension of the block of TQCs. In other words, the number of TQCs 356 in the block of TQCs may be equal to block size squared. For instance, block size may be determined as the square root of the number of TQCs 356 in the block of TQCs. Resolution may be defined as a pixel width by a pixel height. Resolution information may include a number of pixels for the width of a picture, for the height of a picture or both. Block size may be defined as the number of TQCs 356 along one dimension of a 2D block of TQCs.

In some configurations, the bitstream 314 may be transmitted to another electronic device. For example, the bitstream 314 may be provided to a communication interface, network interface, wireless transmitter, port, etc. For instance, the bitstream 314 may be transmitted to another electronic device via LAN, the Internet, a cellular phone base station, etc. The bitstream 314 may additionally or alternatively be stored in memory on the electronic device 302.

Figure 4:
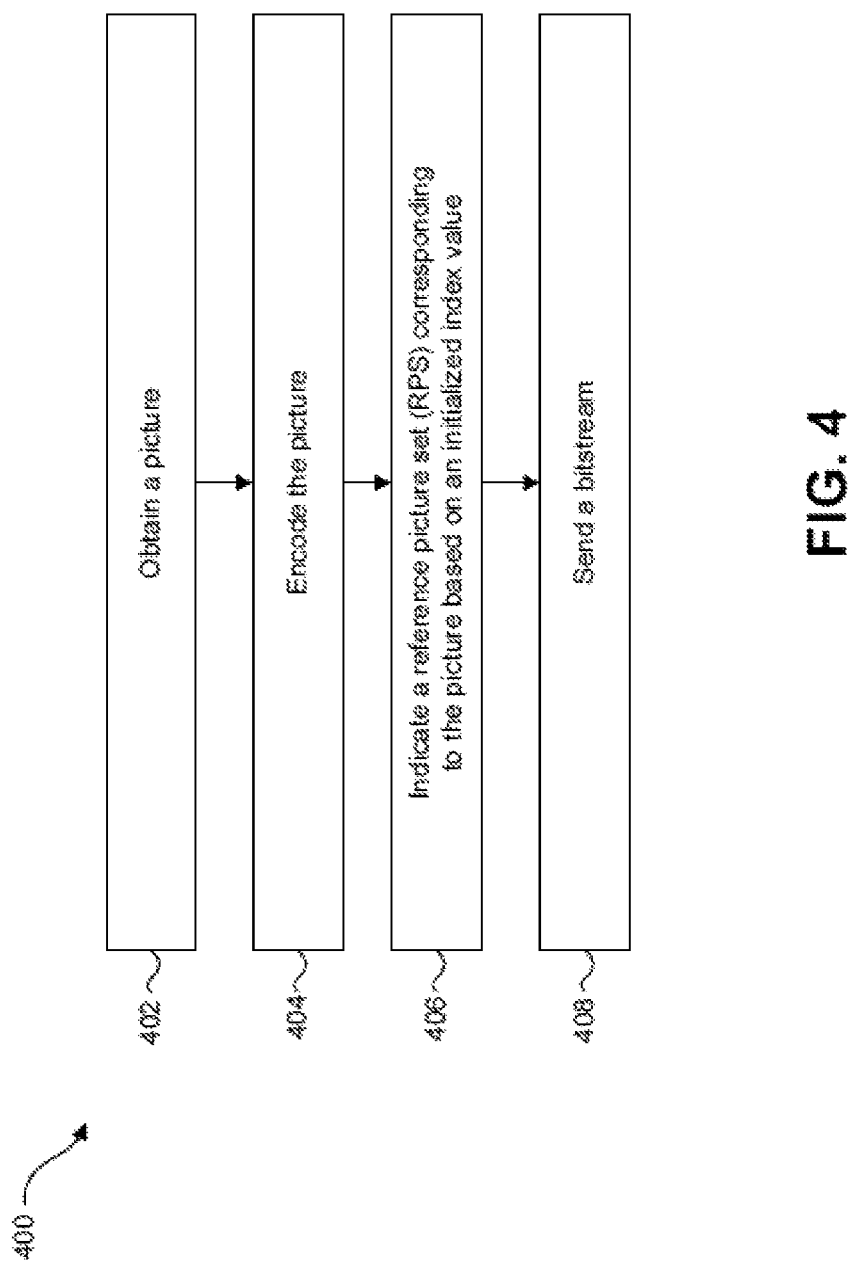
FIG. 4 is a flow diagram illustrating one configuration of a method for reducing RPS signal overhead on an electronic device.

FIG. 4 is a flow diagram illustrating one configuration of a method 400 for reducing RPS signal overhead on an electronic device 302. The electronic device 302 may obtain 402 a picture 226. For example, the picture 226 may be received from a supplier 334. In some instances, the picture 226 may be obtained from a remote source.

The picture 226 may be encoded 404. This may be performed, for example, on an encoder 304. The encoder 304 may be an HEVC type encoder 304.

A RPS corresponding to the picture 226 based on an initialized index value may be indicated 406. For example, this indication may be made in the slice header of the picture 226 and/or in the PPS of the picture 226. The initialized value may assist the electronic device 302 in processing the RPS. In some cases, the initialized value may help reduce RPS signal overhead. In some cases, using the initialized value may result in smaller RPS index values being sent in the bitstream 314, thus reducing overhead. For instance, smaller RPS index values may be represented with fewer bits to reduce overhead. In other cases, using the initialized index value may result in one less RPS index value being sent in the bitstream 314, which also reduces RPS signaling overhead.

The electronic device 302 may send 408 a bitstream. The bitstream 314 may be sent 408 to the same electronic device 302 and/or a remote device. The bitstream 314 may include the encoded picture and an RPS.

Figure 5:
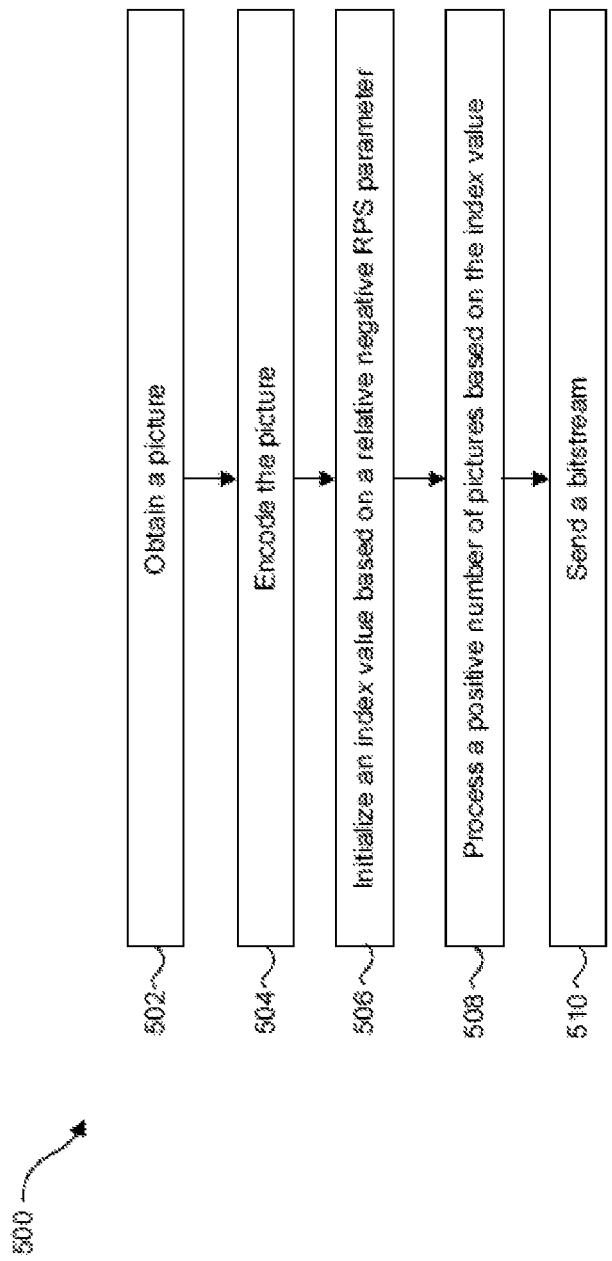
FIG. 5 is a flow diagram illustrating a more specific configuration of a method for reducing RPS signal overhead on an electronic device.

FIG. 5 is a flow diagram illustrating a more specific configuration of a method 500 for reducing RPS signal overhead on an electronic device 302. In one configuration, the electronic device 302 may obtain 502 a picture 226 and encode 504 the picture 226 as discussed previously.

The electronic device 302 may initialize 506 an index value based on a relative negative RPS parameter. For example, the electronic device 302 may process a reference picture to obtain both negative and positive RPS index values. The positive and negative reference pictures may be processed individually. These processes are shown below in Listing (3).

Listing (3) illustrates syntax of one known method for coding positive RPS index values. Specifically, Listing (3) is designed for processing Random Access Hierarchy B under HM 5.0.

---

Listing (3)

---

```
prev = 0;
For (j=0; j < num_negative_pics; j++){
    write( prev - RPS_deltaPoc(j) - 1);
    prev = RPS_deltaPoc(j);
    ...
}
prev = 0;
For (j=0; j < num_positive_pics; j++){
    k = num_negative_pics+ j;
    write(RPS_deltaPoc(k) - prev - 1);
    prev = RPS_deltaPoc(k);
    ...
}
```

---

RPS_deltaPOC refers to the RPS index values. RPS_deltaPOC[0] to RPS_deltaPOC[num_negative_pics−1] stores the negative RPS index values. RPS_deltaPOC[num_negative_pics] to RPS_deltaPOC[num_negative_pics+num_positive_pics−1] stores the positive RPS index values.

Listing (3) illustrates pseudo code for one approach of processing positive RPS index values. For example, an RPS with reference indexes [−2, −4, 2], first codes the negative RPS picture indexes. Then the positive picture indexes are differentially coded. This results in four RPS index values. In processing both the positive and the negative reference RPS index values, the previous index value or "prev" is set to 0. This is always the case when processing the positive RPS index value. prev is initialized independently of the number of negative pictures or any negative RPS parameters. In this example, when the RPS index values are [−2, −4, 2], 9 bits are required to send the RPS index values.

In contrast to Listing (3), the systems and methods disclosed herein describe that an index value may be initialized 506 based on a relative negative RPS parameter. Thus, rather than initializing prev to 0 each time the positive RPS index values are processed, prev is initialized based on a negative RPS parameter. Listing (4) illustrates an example of pseudo code that illustrates this distinction. Modifications to the syntax in accordance with the systems and methods disclosed herein are denoted in bold.

---

Listing (4)

---

```
prev = 0;
For (j=0; j < num_negative_pics; j++)
{
write( prev - RPS_deltaPoc(j) - 1);
prev = RPS_deltaPoc(j);
...
}
```
prev = (smallest absolute value of negative RPS_deltaPoc) − 1;
```
For (j=0; j < num_positive_pics; j++)
{
k = num_negative_pics+ j;
write(RPS_deltaPoc(k) - prev - 1);
prev = RPS_deltaPoc(k);
...
}
```

---

As illustrated in Listing (4), prev may be initialized to the smallest absolute value of negative RPS_deltaPoc minus 1. It should be noted that the terms RPS_deltaPOC and RPS index values may be used interchangeably. The smallest absolute value of negative RPS_deltaPoc is the absolute value of the smallest negative reference picture stored in the RPS index for a current picture. For example, if a current picture contains the relative reference RPS index values of [−4, −6, 4], −4 and −6 are the negative RPS_deltaPoc index values. When the absolute values of each are taken, 4 and 6 are obtained, respectively. Taking the smallest value results in obtaining 4.

In a known approach, RPS_deltaPOC values are arranged in ascending order by absolute value within the negative RPS_deltaPOC index values and within the positive RPS_deltaPOC index values to ensure that the difference values coded are not negative. This allows for less bits when coding because negative numbers are avoided. In general, a negative number takes more bits to code than a positive bit that is the absolute value of the same negative number. Under this approach, the smallest absolute value of negative RPS_deltaPoc may be located at RPS_deltaPoc(0).

Applying this example, prev=(smallest absolute value of negative RPS_deltaPoc)−1, prev=(4)−1=3. In another example where the smallest absolute value of negative of RPS_deltaPoc is 5, prev would equal 4. Thus, the prev index value may be dependent on a negative RPS parameter value such as the smallest absolute value of negative of RPS_deltaPoc.

Using the initialized value, the electronic device 302 may process 508 a positive number of pictures based on the index value. In one example, suppose a current picture has an RPS reference index values of [−2, −4, 2]. When the positive reference pictures are processed and prev is initialized to the smallest absolute value of negative of RPS_deltaPoc, prev equals 1 (e.g., (|−2|)−1=1). To process the first positive value (e.g., 2), RPS_deltaPoc(k)−prev−1 is employed. RPS_deltaPoc(k) equals the value of the first positive RPS index value to be processed. In this example, RPS_deltaPoc(k) equals 2. prev equals 1, as shown above. Thus, RPS_deltaPoc(k)−prev−1=2−1−1=0.

This processing results in a coding of [−2, −4, 0] rather than [−2, −4, 2]. Thus, 8 bits rather than 9 bits are required and overhead is reduced. Due to the symmetrical nature of the coding structure, initializing the index value based on the relative negative RPS parameter will generally result in the first positive index reference value equaling zero. Thus, as the first positive index reference value increases, the number of bits saved also increases.

In some instances, the electronic device 302 may process only the first positive RPS index value in the set of RPS index values based on the relative negative RPS parameter. Each subsequent positive index value may be processed, as shown in Listing (3). In this case, overhead is reduced for the first positive index value for each RPS of each picture sent in the bitstream 114.

The electronic device 302 may send 510 a bitstream 114. By applying the systems and methods described herein, the RPS overhead in the bitstream 114 may be reduced.

Figure 6:
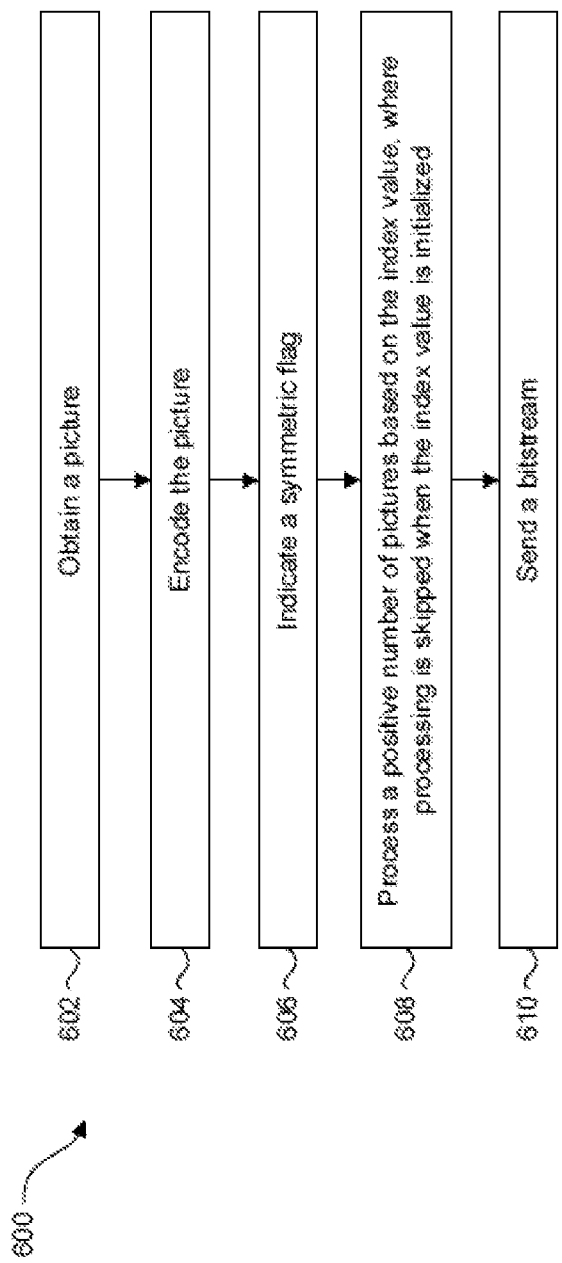
FIG. 6 is a flow diagram illustrating another more specific configuration of a method for reducing RPS signal overhead on an electronic device.

FIG. 6 is a flow diagram illustrating another more specific configuration of a method 600 for reducing RPS signal overhead on an electronic device 302. The electronic device 302 may obtain 602 a picture 226 and encode 604 the picture 226, as discussed previously.

The electronic device may optionally indicate 606 a symmetric flag, such as symmetric_flag, to be sent in bitstream to indicate if the first positive RPS index value can be initialized with a negative RPS index value. For example, the symmetric flag may indicate that the index value should be initialized to the smallest absolute value of negative RPS_deltaPoc. Alternatively, the symmetry flag may indicate not initializing the index value to the smallest absolute value of negative RPS_deltaPoc. In this case the index value may be initialized to zero.

The electronic device 302 may process 608 a positive number of pictures based on the index value. In some cases, the processing skips when the index value is initialized. In other words, when the index value is initialized, the first iteration of processing the positive RPS index values skips writing the first positive RPS index value to the RPS. In the case where only one positive number exits, then no processing of positive numbers occur. The electronic device 302 may also send 610 a bitstream 314.

Listing (5) shows one example of pseudo code syntax in which the present method may be applied. Modifications to the syntax in accordance with the systems and methods disclosed herein are denoted in bold.

Listing (5)

```
prev = 0;
For (j=0; j < num_negative_pics; j++){
    write( prev − RPS_deltaPoc(j) − 1);
    prev = RPS_deltaPoc(j);
    ...
}
prev = 0;
if (num_positive_pics)
    write(symmetric_flag);
For (j=0; j < num_positive_pics; j++){
    k = num_negative_picsnumNegativePictures+ j;
    if (j>0 || ! symmetric_flag)
        write(RPS_deltaPoc(j) − prev − 1);
    prev = RPS_deltaPoc(k);
    ...
}
```

When j>0 in processing the positive RPS index value, the condition j==0 is skipped. In other words, the first positive reference picture is skipped.

Returning now to the condition where j>0. In this instance, j is initialized to 0 in the for loop when processing the positive RPS index values. Upon initialization, the processing of positive RPS index values skips the first positive RPS index value. For example, in the case of RPS index values [−8, −4, 4, 6], in processing the positive RPS index values, 4 will be skipped over and only 6 will be added to the RPS index for the current picture.

In another example, for index values [−2, −4, 2, 6], if the symmtetic_flag is true, for the positive RPS_deltaPOC values, the first one must be equal to 2, as derived from the negative reference picture indexes. In this manner, processing of the positive RPS index values may begin from the second positive RPS index value (e.g., 6). Hierarchical coding structures, such as Random Access (Hierarchical B), the symmetric condition between the start of positive and negative RPS index is usually true. This is due to the symmetrical nature of each current picture in relation to deltaPOC reference pictures.

In the case of only one positive RPS index value, the electronic device 302 may skip processing of the positive values. For example, for index values [−4, −8, 4], after processing, an RPS of [−4, −8] may be sent to the bitstream. Then upon receipt, the receiving electronic device, such as a decoder, may receive the RPS index values [−4, −8] and derive reference index values of [−4, −8, 4] for the current picture being decoded. Thus, by skipping the first positive reference picture in each RPS for each current picture, significant overhead savings may be achieved in RPS signaling.

For example, Listing (6) shows syntax for processing RPS index values on a decoder.

Listing (6)

```
ref_pic_set( idx ) {
    num_negative_pics
    num_positive_pics
    If (num_positive_pics) {
        symmetric_flag
    }
    for( i = 0; i < num_negative_pics; i++ ) {
        delta_poc_s0_minus1[ i ]
        used_by_curr_pic_s0_flag[ i ]
    }
```

-continued

Listing (6)

```
for( i = 0; i < num_positive_pics; i++ ) {
    If (i!=0 || ! symmetric_flag) {
        delta_poc_s1_minus1[ i ]
    }
    used_by_curr_pic_s1_flag[ i ]
    }
}
```

Listing (6) shows one example a syntax which can be processed by a decoder. This syntax may be generated by an electronic device 302 using the approach discussed in connection with Listing (5). For example, the decoder may check symmetric_flag to see if there is an indication that the smallest negative RPS index value is symmetrical with a corresponding positive RPS index value. If symmetric_flag indicates such, the decode may decode the RPS and use the absolute value of the smallest negative RPS index value at the RPS index value of the first positive RPS index value. It will be appreciated that other approaches to decode a picture as listed in Listing (6) may be employed which correspond to the encoding approach discussed above in connecting with Listing (5).

Figure 7:
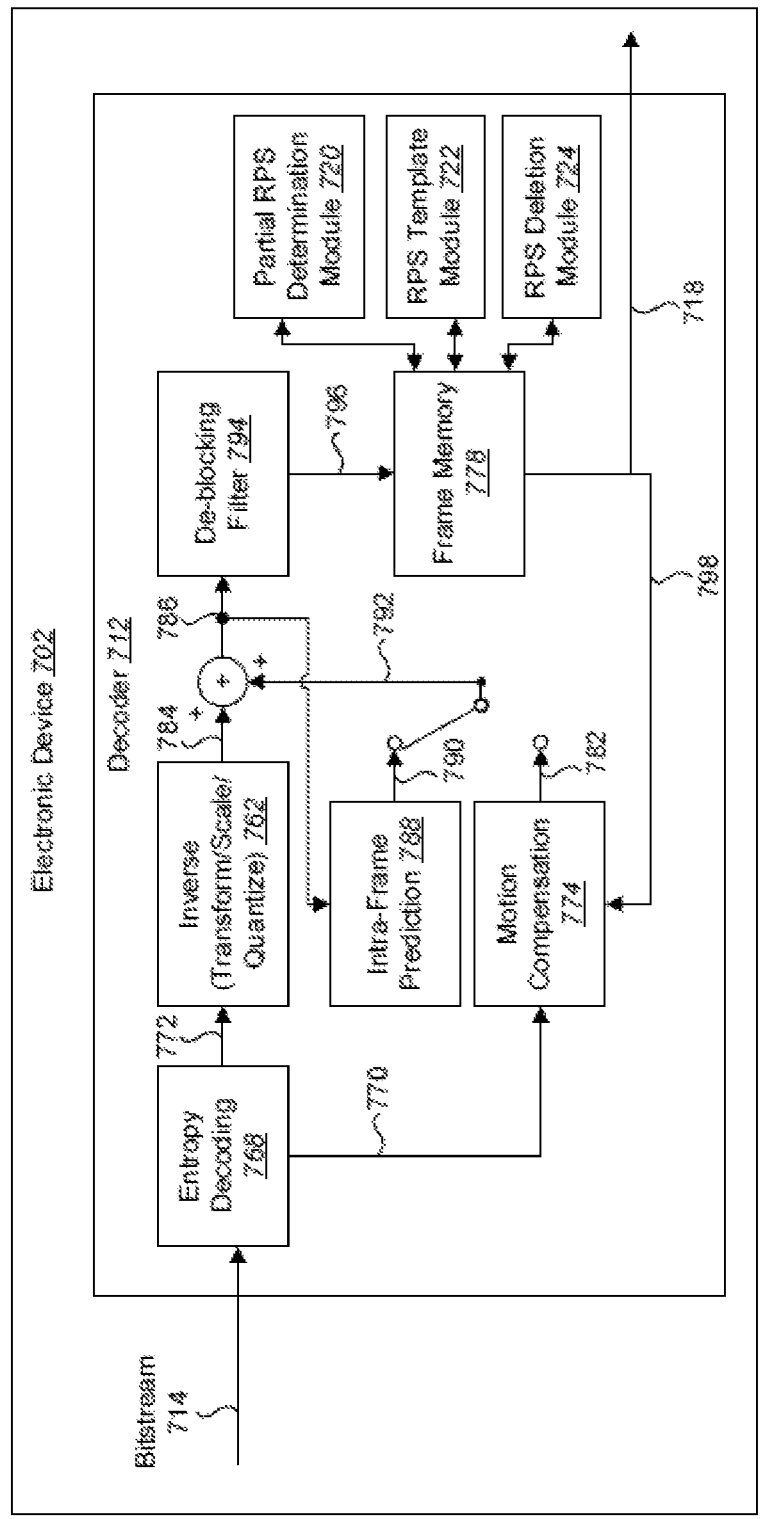
FIG. 7 is a block diagram illustrating one configuration of a decoder on an electronic device.

FIG. 7 is a block diagram illustrating one configuration of a decoder 712 on an electronic device 702. The decoder 712 may be included in an electronic device 702. For example, the decoder 712 may be a HEVC decoder. The decoder 712 and/or one or more of the elements illustrated as included in the decoder 712 may be implemented in hardware, software or a combination of both. The decoder 712 may receive a bitstream 714 (e.g., one or more encoded pictures included in the bitstream 714) for decoding. In some configurations, the received bitstream 714 may include received overhead information, such as a received slice header, received PPS, received buffer description information, etc. The encoded pictures included in the bitstream 714 may include one or more encoded reference pictures and/or one or more other encoded pictures.

Received symbols (in the one or more encoded pictures included in the bitstream 714) may be entropy decoded by an entropy decoding module 768, thereby producing a motion information signal 770 and quantized, scaled and/or transformed coefficients 772.

The motion information signal 770 may be combined with a portion of a reference frame signal 798 from a frame memory 778 at a motion compensation module 774, which may produce an inter-frame prediction signal 782. The quantized, descaled and/or transformed coefficients 772 may be inverse quantized, scaled and inverse transformed by an inverse module 762, thereby producing a decoded residual signal 784. The decoded residual signal 784 may be added to a prediction signal 792 to produce a combined signal 786. The prediction signal 792 may be a signal selected from either the inter-frame prediction signal 782 or an intra-frame prediction signal 790 produced by an intra-frame prediction module 788. In some configurations, this signal selection may be based on (e.g., controlled by) the bitstream 714.

The intra-frame prediction signal 790 may be predicted from previously decoded information from the combined signal 792 (in the current frame, for example). The combined signal 792 may also be filtered by a de-blocking filter 794. The resulting filtered signal 796 may be written to frame memory 778. The resulting filtered signal 796 may include a decoded picture.

The frame memory 778 may include a DPB as described herein. The DPB may include one or more decoded pictures that may be maintained as short or long term reference frames. The frame memory 778 may also include overhead information corresponding to the decoded pictures. For example, the frame memory 778 may include slice headers, PPS information, cycle parameters, buffer description information, etc. One or more of these pieces of information may be signaled from an encoder (e.g., encoder 304). The frame memory 778 may provide a decoded picture 718.

The decoder 712 may include a partial RPS determination module 720, an RPS template module 722 and/or an RPS deletion module 724. The partial RPS determination module 720 may generate a partial RPS based on signals obtained from the bitstream 714. In some cases, a partial RPS may be determined on the decoder 712 based on a full RPS. Greater detail regarding partial RPS determination module 720 is described below.

The RPS template module 722 may derive an RPS template at the decoder 712. In some instances, the RPS template may be created based on signals received for the bitstream 714, such as a GOP size, a coding structure and rules.

The RPS deletion module 724 may receive indications at the decoder 712 to delete a previously received RPS. For example, the bitstream 714 may include a flag in a PPS and a bit field in a slice header of a picture. The RPS deletion module 724 may assist in identifying missing reference pictures. Greater detail regarding the RPS deletion module 724 will be given below.

Figure 8:
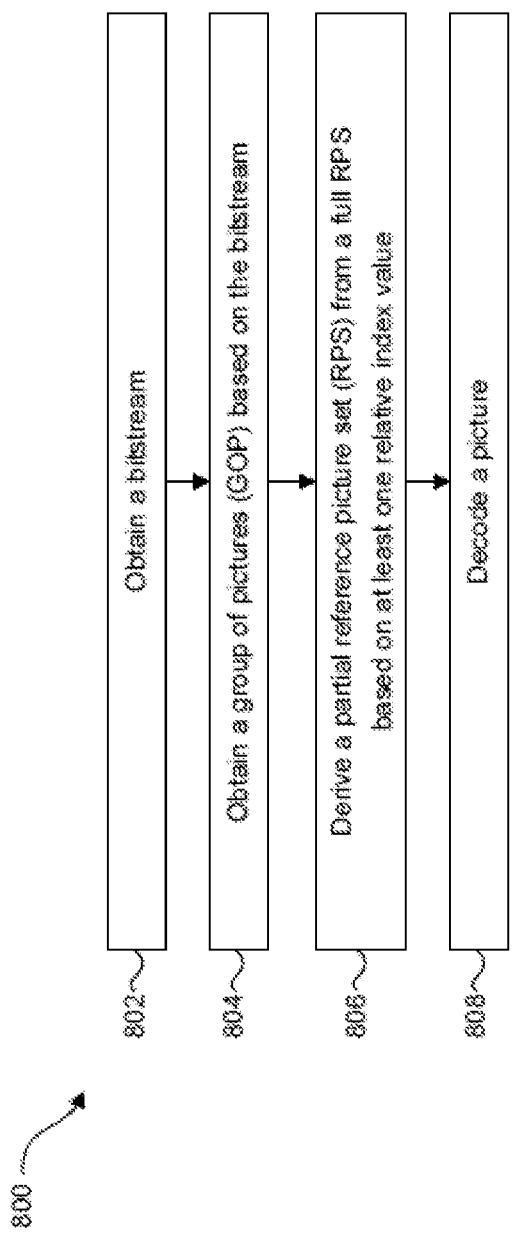
FIG. 8 is a flow diagram illustrating one configuration of method for reducing RPS signal overhead on an electronic device.

FIG. 8 is a flow diagram illustrating one configuration of method 800 for reducing RPS signal overhead on an electronic device 702. The electronic device 702 may obtain 802 a bitstream 714. For example, the bitstream 714 may be obtained from the electronic device 702 where a decoder 712 is located, or alternatively from another electronic device.

The electronic device 702 may obtain 804 a GOP based on the bitstream 714. In some cases, a GOP may be specified as a specific number of sequential pictures, such as four or eight pictures. For example, the electronic device 702 may obtain 804 a GOP that includes 8 pictures.

There may be various ways that the electronic device 702 may derive a full RPS. In one configuration, the electronic device 702 may receive GOP size, coding structure and other necessary information, such as the PPS.

To derive the full RPS, the electronic device 702 may determine the coding order according to coding structure and GOP size. For instance, with low delay coding, the coding order may be the display order. In another instance, with Hierarchical B, the coding order may employ minimum decoding delay. In one example that is similar to the example illustrated in FIG. 2, a GOP, with a size of 8, will code in the order of POC 8, 4, 2, 1, 3, 6, 5, 7. Alternatively, a coding order may be coded from a lower hierarchy towards higher hierarchy. In this example, a GOP, with the size of 8, will code in the order of POC 0, 8, 4, 2, 6, 1, 3, 5, 7. Additionally, a flag can be used to denote which coding order to use. In some cases, the flag may be a bit flag.

To derive the full RPS, the electronic device 702 may also determine the reference pictures based on coding structure, temporal layer id, number of reference pictures and additional rules set by the encoder and the decoder. For example, in the case of low delay coding with N reference frame, a preceding picture with same or lower temporal layer may always serve as a reference picture. Then, for the remaining N−1 reference pictures, additional rules can be specified to select reference pictures depending on coding order and/or hierarchy layer. A parameter may be used to specify which rule should be used. An example of this parameter is reference_picture_selection_rule, and is discussed below in association with Listing (9).

Additionally, to derive the full RPS, the electronic device 702 may loop (e.g., iterate) the GOP in coding order. The electronic device 702 may add or keep reference pictures that will be later referenced in connection with subsequent pictures. These subsequent pictures may be in the same or later GOPs then the current picture. If a reference pictures is to be used for reference later, it may be marked for future use. Otherwise, it may be marked, "not for reference."

The electronic device 702 may derive 806 a partial RPS from a full RPS based on at least one relative index value. For example, the electronic device 702 may attempt to derive a full RPS.

However, because some reference pictures are missing or have not been obtained, only a partial RPS may be derived.

A partial RPS may be for frames that have unavailable reference pictures due to IDR or CRA, such as occurs at the start of a picture sequence. For example, suppose a first picture is at POC 8 with RPS index values of [−8, −10, −12, −16]. Being the first received picture, it does not yet have reference pictures corresponding to RPS index values [−10, −12, −16]. In this example, the first picture cannot use the full RPS with index reference values of [−8, −10, −12, −16]. Rather, a partial RPS contains index value [−8], and this index value represents the only reference picture that may be used to decode the picture (e.g., POC 8).

The electronic device 702 may then decode 808 a picture based on the partial RPS. In other words, the electronic device 702 may decode 808 a picture using the reference pictures available to it.

In some implementations, a partial RPS may be additionally derived on the encoder 304 side of an electronic device 302. However, by deriving a partial RPS at the decoder 712, RPS overhead in the bitstream 714 is reduced due to the partial RPS not being sent over in addition to the full RPS being sent over.

Listing (7) shows one approach for deriving a partial RPS.

Listing (7)

```
pic_parameter_set_rbsp( ) {
    pic_parameter_set_id
    seq_parameter_set_id
    entropy_coding_mode_flag
    num_full_ref_pic_sets
    num_partial_ref_pic_sets
    for(idx = 0; idx < num_full_ref_pic_sets; idx++)
        ref_pic_set( idx )
    i=0
    while( idx < NumRefPicSets ) {
        partial_ref_pic_set_flag[ i ]
        if( partial_ref_pic_set_flag ) {
            for( j=0; j < NumNegativePics[ i %
                num_full_ref_pic_set ]; j++ )
                ref_flag[ j ]
            idx++
        }
        i++
    }
}
```

In Listing (7), num_full_ref_pic_sets specifies the number of full reference picture sets that are specified in the picture parameter set. num_partial_ref_pic_sets specifies the number of partial reference picture sets that are specified in the picture parameter set. ref_flag[j] specifies whether the content of the full reference picture set is copied to the partial reference picture set.

Figure 9:
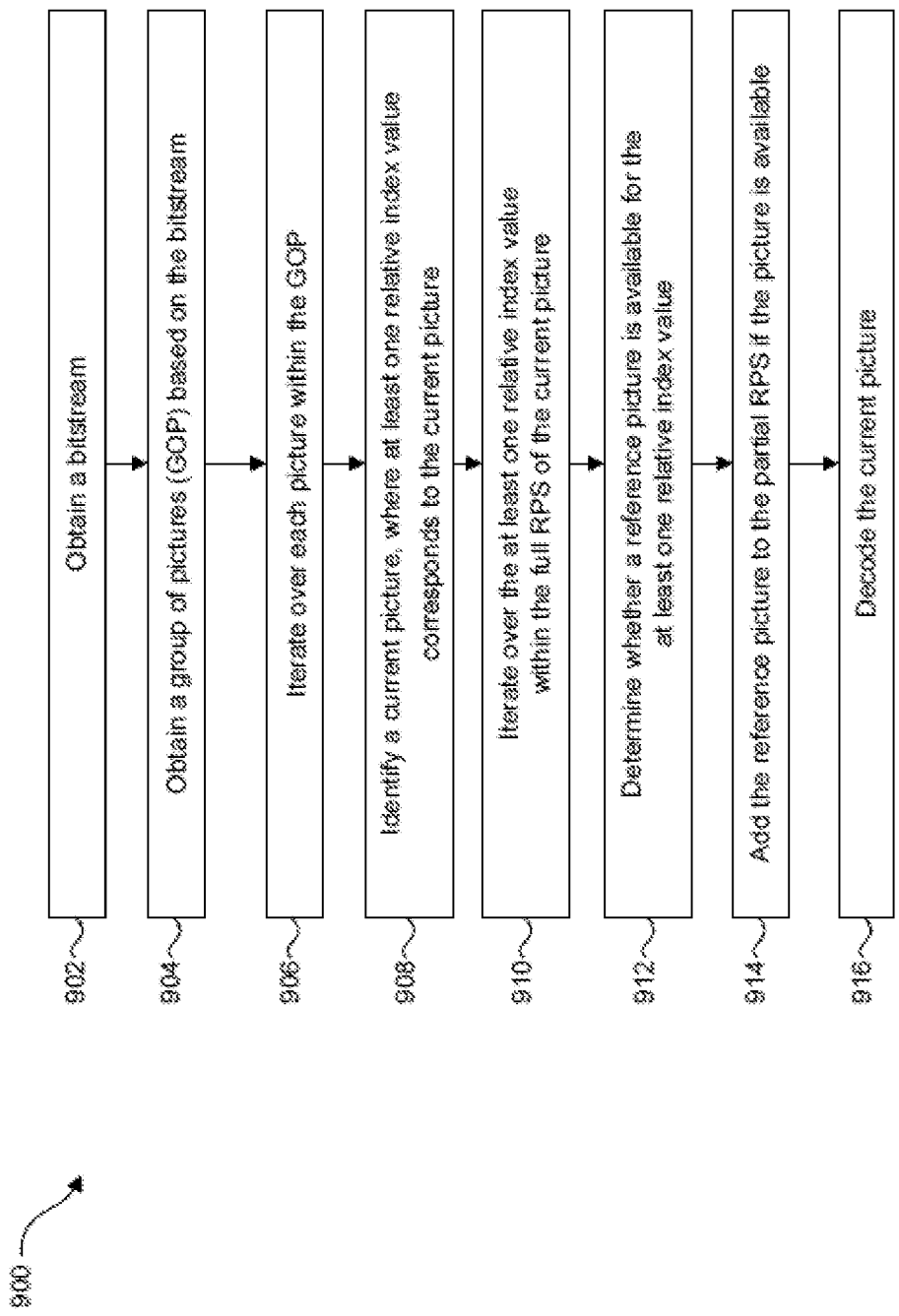
FIG. 9 is a flow diagram illustrating one configuration of a method for deriving a partial RPS on an electronic device.

FIG. 9 is a flow diagram illustrating one configuration of a method 900 for deriving a partial RPS on an electronic device 702. In order to decode a picture, the electronic device 702 may need to reference the RPS of the current picture. However, the full RPS may not be available. In this case, a partial RPS may be constructed.

In one configuration, a partial RPS may be constructed by the electronic device 702. The electronic device 702 may obtain 902 a bitstream 714 and obtain 904 a GOP based on the bitstream in a similar manner, as described above.

The electronic device 702 may iterate 906 over each picture within the GOP. For instance, the electronic device 702 may loop through each picture and identify the RPS index values corresponding to each picture. In some cases, iteration may also occur over multiple GOPs as well.

The electronic device 702 may identify 908 a current picture, where the relative index value corresponds to the current picture. For example, this may be the picture the electronic device 702 is trying to decode. Additionally, in identifying 908 a current picture, the electronic device 702 may also identify the POC for the current picture. For instance, the POC may specify the POC of the current picture in the GOP.

Listing 8 below shows and example of syntax for generating a partial RPS. In Listing (8) current_poc_in_GOP specifies the current POC in a GOP. current_poc_in_GOP ranges from 1 to the GOP size.

Listing (8)

```
pic_parameter_set ( ) {
    pic_parameter_set_id
    seq_paramater_set_id
    entropy_coding_mode_flag
    num_ref_pic_sets
    for(idx=0; idx < num_ref_pic_sets_idx++){
        ref_pic_set(idx)
        current_poc_in_GOP
    }
    ...
}
ref_pic_set(idx){
    num_negative_pics
    num_positive_pics
    for(i = 0; i < num_negative_pics; i++){
        delta_poc_s0_minus1[i]
        used_by_curr_pic_s0_flag[i]
    }
    for(i = 0; i < num_positive_pics; i++){
        delta_poc_s1_minus1[i]
        used_by_curr_pic_s1_flag[i]
    }
}
```

The electronic device 702 may iterate 910 over the at least one relative index value within the full RPS of the current picture. For example, if the current picture has RPS index values of [−1, −5, −9, −13], then the electronic device would loop through reference pictures located at deltaPOC=−1, deltaPOC=−5, deltaPOC=−9 and deltaPOC=−13.

The electronic device 702 may determine 912 whether a reference picture is available for each relative index value. In the example above, the electronic device 702 may attempt to access reference pictures located at deltaPOCs=−1, −5, −9 and −13. However, one or more the reference pictures may be missing.

One approach for determining 912 whether a reference picture is available is by satisfying the condition currentPOC+refDeltaPOC<POC_of_Latest_CRA. POC_of_Latest_CRA indicates the position of the latest clean random access (CRA) picture. In other words, POC_of_Latest_CRA is the POC of the latest IDR or CRA picture. If an RPS index values refers to a reference picture located before the latest CRA picture, then the reference picture will not be available. Thus, if currentPOC+refDeltaPOC<POC_of_Latest_CRA is satisfied, then the relative reference picture is missing and is not added to the partial RPS.

As an example, suppose the current picture has a POC of 1. (e.g., POC=1) and POC_of_Latest_CRA is 0. Again, suppose that the current picture has RPS index values of [−1, −5, −9, −13]. Applying the condition currentPOC+refDeltaPOC for the first index value results in 0 (e.g., 1+−1=0). Because the condition is not satisfied (e.g., 1+−1 is not less than 0 or POC_of_Latest_CRA), the first reference index value is added to the partial RPS. Applying currentPOC+refDeltaPOC to the other RPS reference index values produce results where currentPOC+refDeltaPOC is less than POC_of_Latest_CRA. Thus, no other index values are added to the partial RPS.

As another example, suppose the current picture has a POC of 5. (e.g., POC=5). Again, suppose that the current picture has RPS index values of [−1, −5, −9, −13]. Applying the condition currentPOC+refDeltaPOC for the RPS index values results in [4, 0, −4, −8], respectively. Because the first two values are not less than zero, the corresponding RPS reference index values are added to the partial RPS. Thus, the partial RPS created in this example has the index values of [−1, −5].

The electronic device 702 may add 914 the reference picture to the partial RPS if the picture is available. The electronic device 702 may also decode 916 the current picture using the partial RPS index values.

In yet other configurations, the electronic device 702 may evaluate the partial RPS and determine to insert additional pictures. For example, a partial RPS with only one reference to a reference picture may be modified to include three additional reference pictures that may be useful in decoding that current picture.

Figure 10:
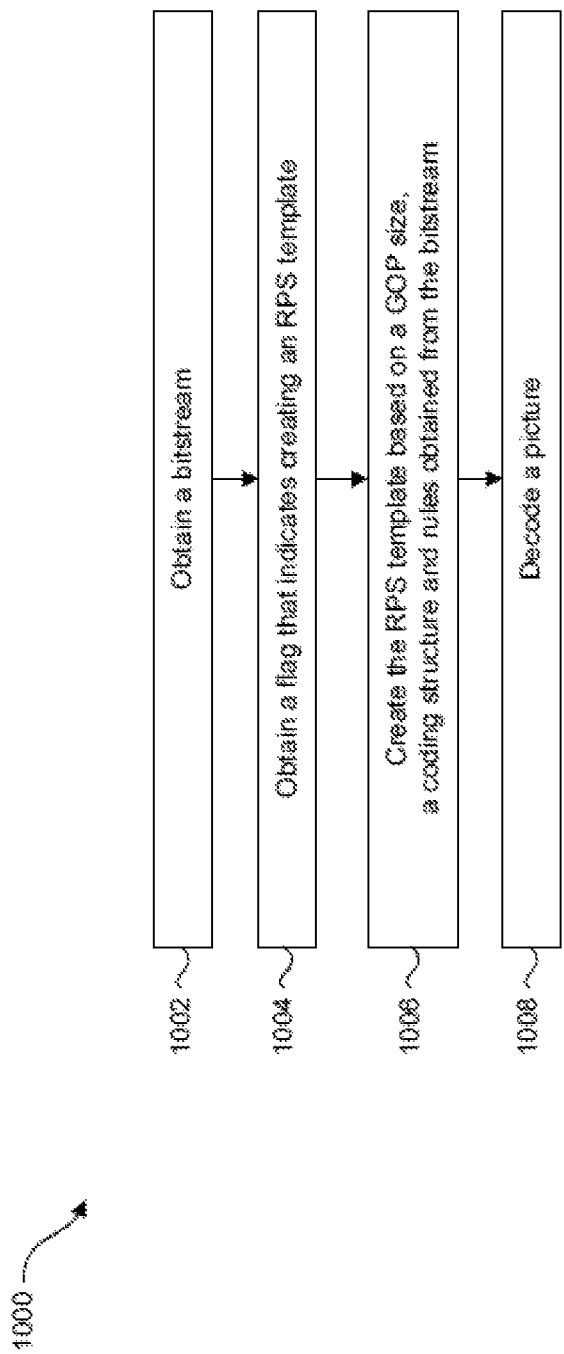
FIG. 10 is a flow diagram illustrating one configuration of a method for deriving an RPS template on an electronic device.

FIG. 10 is a flow diagram illustrating one configuration of a method 1000 for deriving an RPS template on an electronic device 702. As discussed in connection with Tables (1)-(4), RPS templates may be used in video coding to assist in processing frequently used coding structures. An example of such structure is a Random Access Hierarchical B coding structure with a GOP size equal to 8 or 16. Another example is a Low Delay coding structure with the GOP size equal to 4 or 8.

In one configuration, an RPS template may be created. It should be noted that creation on an RPS template may be derived at both the encoder and decoder side without sending the full RPS in the PPS. Further, derivation of the RPS template may occur in connection with, or independent or the creation of a partial RPS, as discussed above.

The electronic device 702 may obtain 1002 a bitstream 714. The electronic device 702 may obtain 1004 a flag that indicates creating the RPS template. For example, the flag may be located and sent in the PPS.

As another example, the electronic device 702 may have and/or obtain a set of rules used to derive RPS templates for commonly used GOP sizes, coding structures, temporal layer settings and temporal interleaving patterns.

Using these rules, the electronic device 702 may create 1006 an RPS template based on a reduced amount of information. For instance, an RPS template may be derived by using information regarding the GOP size, the coding structure and rules. The coding structure, for instance, may specify Random Access (Hierarchical B) or Low Delay. The rules may, for example, specify the settings for the temporal layers. Listing (9) below shows Listing (9) below shows syntax of an approach for deriving an RPS.

---
Listing (9)
---

```
Picture_parameter_set( idx ) {
  ...
    derive_rps_with_model_flag
    If (derive_rps_with_model){
      coding_structure
      GOP_size_log2
      for (i=0; i < GOP_size_log2; i++) {
        number_reference_pictures
      }
      reference_picture_selection_rule
      if (coding_structure==0) {
        coding_order
      }
      temporal_layer_exist_flag
      If (temporal_layer_exist_flag)
        temporal_id_ordering
    }
  }
  ...
```
--- derive_rps_with_model_flag specifies whether to derive an RPS at the decoder side. derive_rps_with_model_flag set to 0 indicates to send the RPS in the PPS. derive_rps_with_model_flag set to 1 indicates to derive the RPS at the decoder.

coding_structure equal to 0 means that the coding structure is Hierarchical B coding. A coding structure equal to 1 denotes that the coding structure is Low delay coding.

GOP_size_log 2 refers to the log 2 of GOP size. GOP size equals $2^{(GOP\_size\_log\ 2)}$. number_of_reference_pictures(i) specifies the number of reference pictures used per reference picture list (e.g., RefPicList0 and/or RefPicList1) for the $i^{th}$ hierarchical layer. reference_picture_selection_rule specifies the commonly defined rules to select a reference picture by an encoder and a decoder.

coding_order may specify rules to determine coding order. A coding_order of 0 may denote a first coding order and a coding_order of 1 may denote a second coding order. In one configuration, for example, a coding_order of 0 may denote the minimum decoding delay order and a coding_order of 1 may denote a hierarchy priority order (e.g., coding from the lowest hierarchy layer to a higher hierarchy layer).

temporal_layer_exist_flag specifies if different temporal layers exist. A flag equal to 0 means all frames have the same temporal layer and a flag equal to 1 means different temporal layers exist.

temporal_id_ordering specifies the ordering of pictures with same temporal_id in a current GOP. For instance, a value of 1 indicates that pictures in the current GOP with same temporal_id are continuous in decoding order. Alternatively, a value of 0 indicates that pictures in the current GOP with the same temporal_id are interleaved in decoding order.

Using the created RPS template, the electronic device 702 may decode 1008 a picture. In the case of non-common RPS code structures, the RPS template may also be signaled directly sending the RPS template in PPS and/or slice header.

Figure 11:
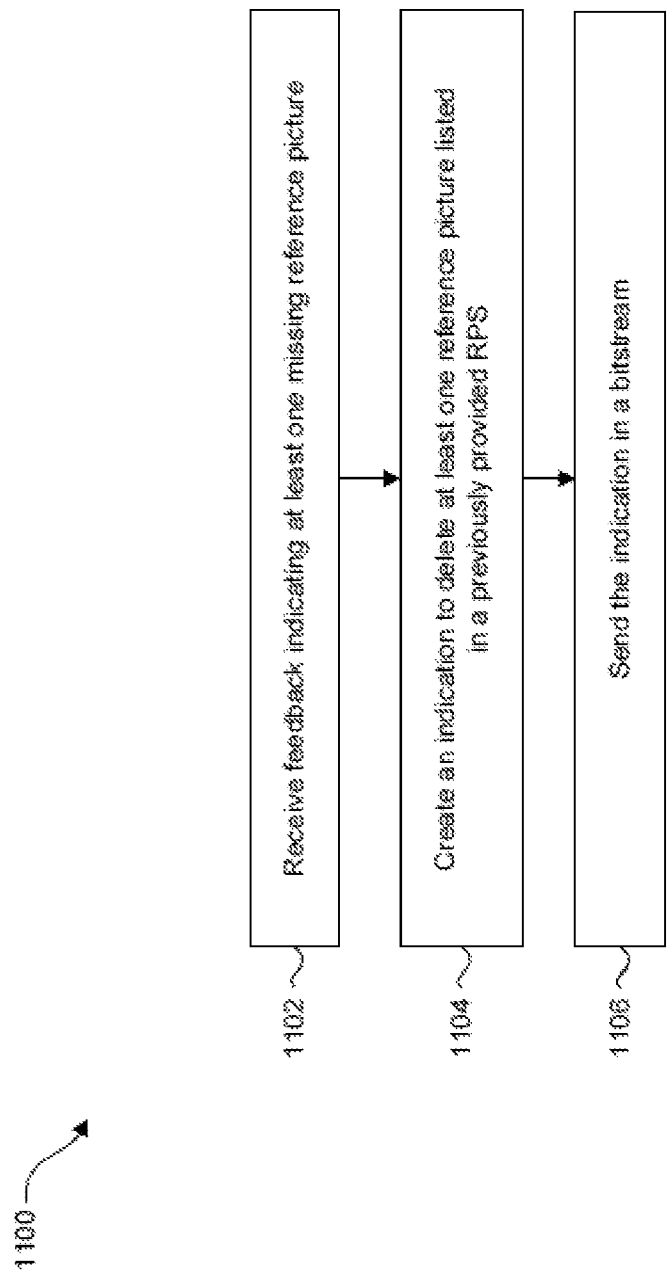
FIG. 11 is a flow diagram illustrating one configuration of a method for creating an indication to delete at least one reference picture on an electronic device.

FIG. 11 is a flow diagram illustrating one configuration of a method 1100 for creating an indication to delete at least one reference picture on an electronic device 302. In some known implementations, such as that given in Joint Collaborative Team on Video Coding (JCTVC) document JCTVC-F803_d5, indicating a delete operation on a previously signaled RPS is not supported. In other words, the PPS does not support sending a signal to delete a previously sent RPS.

In another known implementation, such as JCTVC-G637, pruning of reference picture sets have been proposed. In this implementation, a number of short term reference pictures that are omitted from a particular RPS may be signaled in the PPS for pruning. One example of where some of the pictures signaled in RPS are not available, is the first GOP following a random access point. However, JCTVC-G637 only allows for pruning consecutive negative pictures.

In yet another known implementation, such as JCT-G198, a signaling scheme is proposed that sends a constant deltaRPS value. Also, a sent field value (e.g., 00) may signal that a previous reference picture should not be used (e.g., should be skipped).

In some known implementations, long-term reference pictures (LTRPs) are explicitly signaled individually in each slice header. Thus, when a LTRP is not signaled, it will be deleted. Accordingly, sending a delete signal may not be required for a LTRP. However, in some implementations where a LTRPs are signaled, the delete mechanism disclosed herein may additionally be applied to a LTRP.

The systems and methods disclosed herein may provide one or more additional benefits in allowing for signaling a delete operation on a previously signaled RPS. Additional benefits may be obtained by also efficiently signaling a new RPS. In one configuration, an electronic device 302 optionally receives 1102 feedback indication of at least one missing reference picture. The feedback may be from the same or a different electronic device. For example, a decoder 712 decoding a picture may discover a missing reference picture in an RPS and send feedback to the electronic device 302 regarding the missing reference picture.

In another configuration no feedback is received by 302. Instead, the electronic device 302 may send the delete indication after a new CRA or IDR picture has been signaled. For example, a CRA or IDR picture may trigger the electronic device to send a delete indication to delete one or more unnecessary reference pictures listed in a preciously received RPS.

The electronic device 302 may create 1104 an indication to delete at least one reference picture listed in a previously provided RPS. This step may occur in conjunction with, or independent of receiving feedback indicating a missing picture. The electronic device 302 may send 1106 the indication in a bitstream.

As an example, a delete indication (e.g., delete signal) may be sent after the first GOP following a random access point. This may be done without the need to receive a feedback from the decoder 712. The delete indication may be sent as a flag in PPS. For example, the flag value of 1 is sent in the PPS to indicate existence of a deletion bit field in the slice header. Alternatively, the flag value of 0 is sent in the PPS to indicate a deletion bit field is not sent in the slice header.

Additionally and/or alternatively, the delete indication may be sent as a bit field in the slice header for each picture in an indicated RPS. For example, the bit field may send the indication value of 0 in the slice header to indicate deletion of a corresponding reference picture from the indicated RPS or the bit field may send the indication value of 1 in the slice header to indicate that the corresponding reference picture should be kept. The bit field may be sent in the slice header for each of the reference pictures in the indicated RPS. In another configuration, such a bit field may be sent in the slice header only for the negative reference pictures in the indicated RPS. In some configurations, the delete indication may be sent both in the PPS and in the bit field.

Listing (10) below provides one example of syntax that may be used in the PPS to send a delete indication. Modifications to the syntax in accordance with the systems and methods disclosed herein are denoted in bold.

---
Listing (10)
---

```
/* Picture parameter set raw byte sequence payload (RBSP) syntax
*/
pic_parameter_set_rbsp( ) {
    pic_parameter_set_id
    seq_parameter_set_id
    ...
    delete_pics_info_present_flag
    ...
```
---

In Listing (10), a delete_pics_info_present_flag equal to 1 specifies that the slice header may signal a delete operation from the short-term reference picture set included in the picture parameter set. A delete_pics_info_present_flag equal to 0 specifies that no delete operation is signaled in the slice header for the short-term reference picture set included in the picture parameter set. pic_parameter_set_id and seq_parameter_set_id are defined as described above.

Listing (11) below provides one example of syntax that may be used in the slice header to send a delete indication. Modifications to the syntax in accordance with the systems and methods disclosed herein are denoted in bold.

---
Listing (11)
---

```
slice_header( ) {
    ...
    pic_order_cnt_lsb
    short_term_ref_pic_set_pps_flag
    if( !short_term_ref_pic_set_pps_flag )
        short_term_ref_pic_set( num_short_term_ref_pic_sets )
    else {
        short_term_ref_pic_set_idx
        if(delete_pics_info_present_flag )
            for(j=0;j<(num_negative_pics+num_positive_pics);j++) {
                keep_pic_flag[j]
            }
    }
    ...
```
---

In Listing (11), keep_pic_flag[j] equal to 1 specifies that the corresponding $j^{th}$ short term reference picture from the reference picture set in the picture parameter set with index short_term_ref_pic_set_idx should be kept. keep_pic_flag[j] equal to 0 specifies that the corresponding $j^{th}$ short term reference picture from the reference picture set in the picture parameter set with index short_term_ref_pic_set_idx should be deleted (e.g., omitted).

pic_order_cnt_lsb specifies the picture order count modulo MaxPicOrderCntLsb for the top field of a coded frame or for a coded field. The length of the pic_order_cnt_lsb syntax element is log 2_max_pic_order_cnt_lsb_minus4+4 bits. The value of the pic_order_cnt_lsb shall be in the range of 0 to MaxPicOrderCntLsb−1, inclusive. MaxPicOrderCntLsb refers to a maximum possible value for (pic_order_cnt_lsb+1). log 2_max_pic_order_cnt_lsb_minus4 specifies the value of the variable MaxPicOrderCntLsb that is used in the decoding process for picture order count as follows: MaxPicOrderCntLsb= $2^{(log\_2\_max\_pic\_order\_cnt\_lsb\_minus4+4)}$. The value of log 2_max_pic_order_cnt_lsb_minus4 may be in the range of 0 to 12, inclusive.

short_term_ref_pic_set_pps_flag equal to 1 specifies that the short-term reference picture set of the current picture shall be created using syntax elements in the active picture parameter set. short_term_ref_pic_set_pps_flag equal to 0 specifies that the short-term reference picture set of the current picture shall be created using syntax elements in the short_term_ref_pic_set( ) syntax structure in the slice header.

short_term_ref_pic_set_idx specifies the index to the list of the short-term reference picture sets specified in the active picture parameter set that shall be used for creation of the reference picture set of the current picture. The syntax element short_term_ref_pic_set_idx shall be represented by ceil(log 2(num_short_term_ref_pic_sets)) bits. The value of short_term_ref_pic_set_idx shall be in the range of 0 to num_short_term_ref_pic_sets−1, inclusive, where num_short_term_ref_pic_sets is the syntax element from the active picture parameter set.

The variable StRpsIdx is derived as shown in Listing (12) below.

---
Listing (12)

```
if( short_term_ref_pic_set_pps_flag )
    StRpsIdx = short_term_ref_pic_set_idx
else
    StRpsIdx = num_short_term_ref_pic_sets
```
---

In Listing (12), short_term_ref_pic_set indicates a short term reference picture set and num_short_term_ref_pic_sets indicates the total number of short term reference picture sets.

Figure 12:
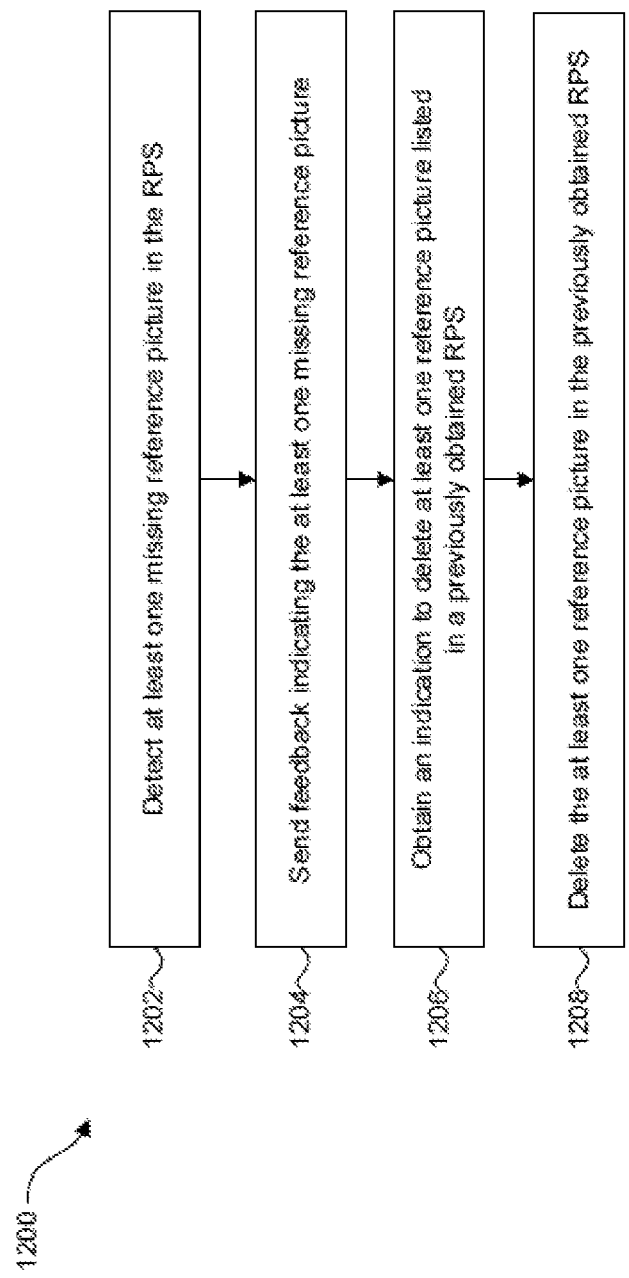
FIG. 12 is a flow diagram illustrating one configuration of a method for deleting at least one reference picture on an electronic device.

FIG. 12 is a flow diagram illustrating one configuration of a method 1200 for deleting at least one reference picture on an electronic device 702. The electronic device 702 may optionally detect 1202 at least one missing reference picture in the RPS. For example, the electronic device 702 may perform steps similar to those described above in connection with creating a partial RPS, in which a determination is made as to whether a reference picture is available. Additionally or alternatively, the electronic device 702 may call a reference picture and discover that it is missing or is corrupt or may detect 1202 a missing reference picture in other ways.

The electronic device 702 may optionally send 1204 feedback indicating the at least one missing reference picture. For example, feedback through a back channel indicating the missing POC, RPS or a variety of other signals may be sent to indicate a missing picture.

The electronic device 702 may obtain 1206 an indication to delete at least one reference picture listed in a previously obtained RPS. In one instance, the signal may be obtained from a flag in PPS and a bit field in slice header for each picture in RPS. For example, delete_pics_info_present_flag and keep_pic_flag[j] may be signaled.

The electronic device 702 may delete 1208 the at least one reference picture in the previously obtained RPS. In some cases, the delete indication may be received with a subsequent RPS that should replace the RPS to be deleted. In another case, the indication may specify deleting a previously received RPS that is no longer needed to decode further pictures. In yet another case, the indication may be to delete a previously received RPS so that a subsequent replacement RPS may be transmitted. It should be noted that the steps of obtaining 1206 an indication to delete at least one reference picture and deleting 1208 the at least one reference picture may be done in conjunction with, or independent of the previous steps of detecting 1202 a missing picture and sending 1204 feedback.

As an example of this, if a previously obtained RPS had the index values of [−2, −1, 1, 3, 5], and the electronic device 702 receives an indication to delete the second reference picture, then the previously obtained reference set would delete the RPS index value of −1. In other words, the previously obtained reference set would become [−2, 1, 3, 5].

Figure 13:
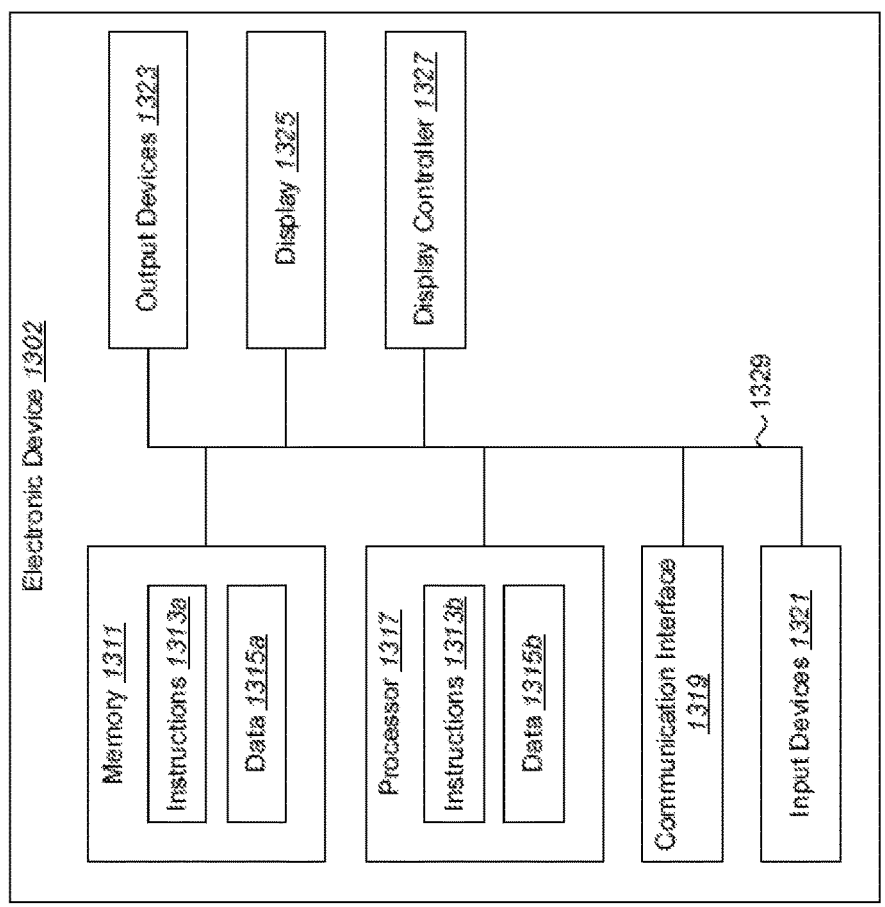
FIG. 13 illustrates various components that may be utilized in an electronic device.

FIG. 13 illustrates various components that may be utilized in an electronic device 1302. The electronic device 1302 may be implemented as one or more of the electronic devices (e.g., electronic devices 102, 302, 702) described herein.

The electronic device 1302 includes a processor 1317 that controls operation of the electronic device 1302. The processor 1317 may also be referred to as a CPU. Memory 1311, which may include both read-only memory (ROM), random access memory (RAM) or any type of device that may store information, provides instructions 1313a (e.g., executable instructions) and data 1315a to the processor 1317. A portion of the memory 1311 may also include non-volatile random access memory (NVRAM). The memory 1311 may be in electronic communication with the processor 1317.

Instructions 1313b and data 1315b may also reside in the processor 1317. Instructions 1313b and/or data 1315b loaded into the processor 1317 may also include instructions 1313a and/or data 1315a from memory 1311 that were loaded for execution or processing by the processor 1317. The instructions 1313b may be executed by the processor 1317 to implement the systems and methods disclosed herein.

The electronic device 1302 may include one or more communication interface 1319 for communicating with other electronic devices. The communication interfaces 1319 may be based on wired communication technology, wireless communication technology, or both. Examples of a communication interface 1319 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The electronic device 1302 may include one or more output devices 1323 and one or more input devices 1321. Examples of output devices 1323 include a speaker, printer, etc. One type of output device that may be included in an electronic device 1302 is a display device 1325. Display devices 1325 used with configurations disclosed herein may utilize any suitable image projection technology, such as a cathode ray tube (CRT), liquid crystal display (LCD), light-emitting diode (LED), gas plasma, electroluminescence or the like. A display controller 1327 may be provided for converting data stored in the memory 1311 into text, graphics, and/or moving images (as appropriate) shown on the display 1325. Examples of input devices 1321 include a keyboard, mouse, microphone, remote control device, button, joystick, trackball, touchpad, touchscreen, lightpen, etc.

The various components of the electronic device 1302 are coupled together by a bus system 1329, which may include a power bus, a control signal bus and a status signal bus, in addition to a data bus. However, for the sake of clarity, the various buses are illustrated in FIG. 13 as the bus system 1329. The electronic device 1302 illustrated in FIG. 13 is a functional block diagram rather than a listing of specific components.

Figure 14:
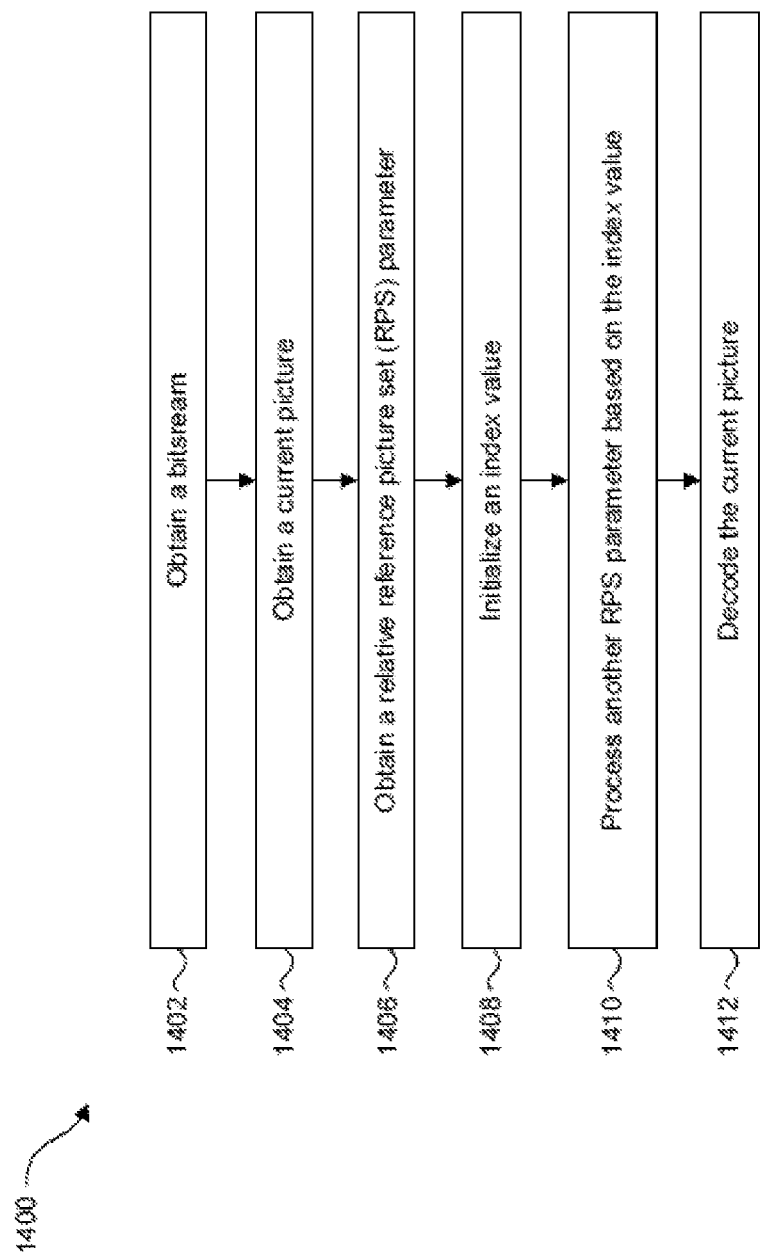
FIG. 14 is a flow diagram illustrating one configuration of a method for decoding a picture on an electronic device.

FIG. 14 is a flow diagram illustrating one configuration of a method 1400 for decoding a picture on an electronic device 702. The electronic device 702 may obtain 1402 a bitstream 714. For example, the bitstream 714 may be obtained from the electronic device 702 (from memory, for example), or may be received from another electronic device.

The electronic device 702 may obtain 1404 a current picture. For instance, the electronic device 702 may obtain 1404 a current picture embedded in the bitstream 714.

The electronic device 702 may obtain 1406 a relative RPS parameter. For example, the relative RPS may be signaled in the PPS. Accordingly, the relative RPS parameter may be obtained from the PPS. In some configurations, the relative RPS parameter may be a negative relative RPS parameter. In other configurations, the relative RPS parameter may be a positive relative RPS parameter. In some configurations, the relative negative RPS parameter may be a negative RPS index value. For example, a negative RPS index value may be relative to the current picture obtained. In other words, the relative RPS index value may refer to the location of a reference picture relative to the index position of the current picture.

While some examples and configurations refer to the relative RPS parameter as a negative RPS parameter, it should be appreciated that a positive parameter may be used in a respective manner. In other words, even though examples are given herein pertaining to a negative relative RPS parameter, similar examples using a positive relative RPS parameter may be employed. Likewise, other examples to positive or negative connotation, in many cases, may be reversed.

The electronic device 702 may initialize 1408 an index value. In some configurations, the electronic device 702 may initialize the index value to 0. In other configurations, the electronic device 702 may initialize the index value based on an obtained parameter.

The electronic device 702 may process 1410 another RPS parameter based on the index value. In some configurations, the other RPS parameter may be a positive RPS parameter. In other configurations, the other RPS parameter may be a negative RPS parameter. In some configurations, the other RPS parameter may be a positive RPS index value. For example, Listing (13) below illustrates one approach to processing a positive RPS parameter based on the index value.

Listing (13)

```
prev = 0;
For (j=0; j < num_negative_pics; j++){
    value = read( ) ;
    RPS_deltaPoc(j) = prev − value −1 ;
    prev = RPS_deltaPoc(j);
    ...
}
prev = 0;
For (j=0; j < num_positive_pics; j++){
    k = num_negative_pics+ j;
    value = read( ) ;
```

Listing (13)
-continued

```
    RPS_deltaPoc(k) = value + 1 + prev ;
    prev = RPS_deltaPoc(k);
    ...
}
```

In Listing (13), value=read( ) represents reading information from the bitstream. In some configurations, the index value may be "prev" as shown in Listing (13). In some configurations, the index value may be RPS_deltaPoc. Furthermore, in some configurations, the index value may be initialized to 0. In other configurations, the index value may be initialized to the smallest absolute value of the negative RPS index value. In yet other configurations, the index value may be initialized to the negative of the smallest value of a positive RPS index value (e.g., the smallest positive RPS index value times −1). In some configurations or instances, the index value may be initialized to a non-zero value.

Similar to the relative RPS parameter, it should be noted that the other RPS parameter may be a positive or negative. In other words, even though examples are given herein pertaining to a positive RPS parameter, similar examples using a negative RPS parameter may be employed. Accordingly, the relative RPS parameter may be negative while the other RPS parameter is positive in some configurations. Alternatively, the relative RPS parameter may be positive while the other RPS parameter is negative in some configurations. In general, the relative RPS parameter and the other RPS parameter may have different signs (e.g., negative or positive).

The electronic device 702 may decode 1412 the current picture. This may be performed, for example, on a decoder 712. The encoder 712 may be an HEVC type decoder 712.

Figure 15:
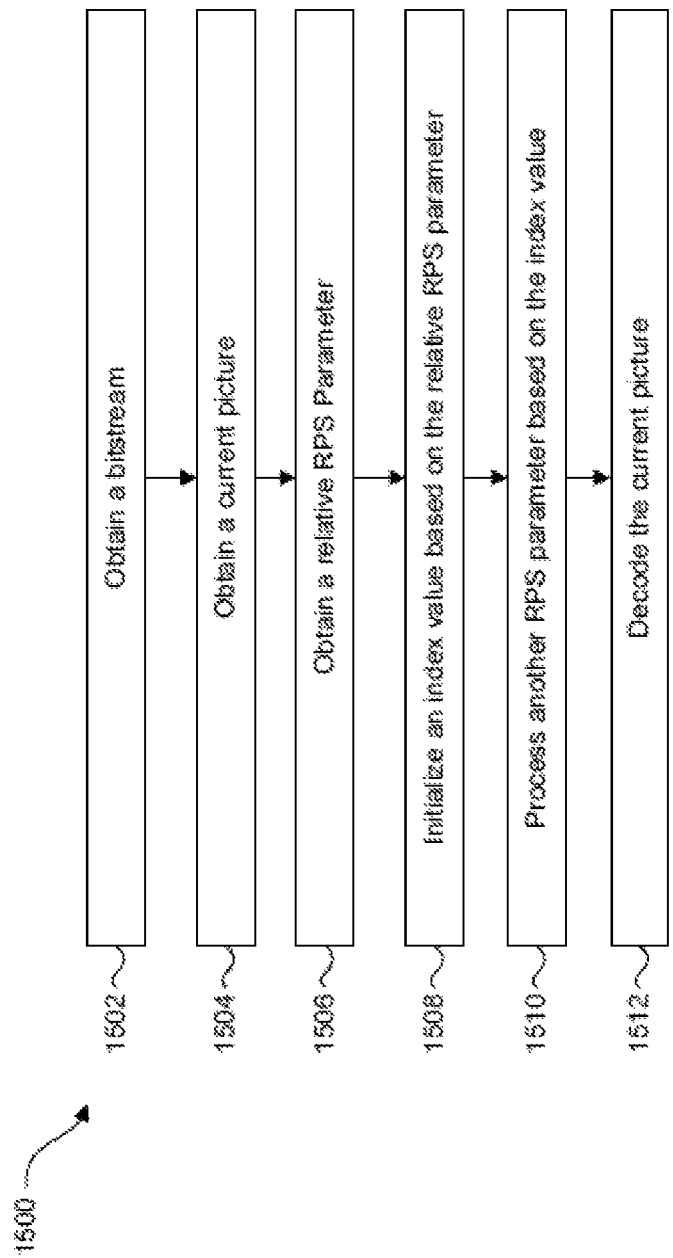
FIG. 15 is a flow diagram illustrating a more specific configuration of a method for decoding a picture on an electronic device.

FIG. 15 is a flow diagram illustrating a more specific configuration of a method 1500 for decoding a picture on an electronic device. In one configuration, the electronic device 702 may obtain 1502 a bitstream, obtain 1504 a current picture and obtain 1506 a relative RPS parameter as discussed previously in connection with FIG. 14.

The electronic device 702 may initialize 1508 an index value based on the relative RPS parameter. For instance, Listing (14) shows one example of syntax for initializing 1508 an index value based on a relative negative RPS parameter. Modifications to the syntax in accordance with the systems and methods disclosed herein are denoted in bold. In some configurations, the approaches discussed in connection with Listing (14) may correspond to the approaches with Listing (4) discussed previously.

Listing (14)

```
prev = 0;
For (j=0; j < num_negative_pics; j++){
    value = read( ) ;
    RPS_deltaPoc(j) = prev − value − 1 ;
    prev = RPS_deltaPoc(j);
    ...
}
prev = (smallest absolute value of negative RPS_deltaPoc) − 1;
For (j=0; j < num_positive_pics; j++){
    k = num_negative_pics+ j;
    value = read( ) ;
    RPS_deltaPoc(k) = value + 1 + prev ;
    prev = RPS_deltaPoc(k);
    ...
}
```

In some configurations, the index value may be "prev" in Listing (14), which may represent a previous index value. In this case, prev may be initialized based on the smallest absolute value of negative RPS_deltaPoc. RPS_deltaPOC refers to the RPS index values.

For example, suppose an RPS with reference indexes of [−2, −4, 2] is obtained by the electronic device 702. However, because of encoding as in the approach discussed in connection with FIG. 4, for example, the first positive RPS index received at the electronic device 702 may have a value of 0. The negative RPS index values are processed to generate one or more relative negative RPS parameters. Here, −2 is obtained as the relative negative RPS parameter.

Continuing with this example, the index value is initialized 1508 based on the relative negative RPS parameter. Listing (14) shows that prev may be initialized based on the relative negative RPS parameter. Here, prev is initialized based on the relative negative RPS parameter −2. In some instances, the relative negative RPS parameter may be the smallest absolute value taken from the set of negative RPS index values for a current picture. Thus, prev is initialized to the smallest absolute value taken from the set of negative RPS index values minus 1. In other words, prev=1 (e.g., |−2|−1).

The electronic device 702 may process 1510 another RPS parameter based on the index value. For instance, returning to the above example, the electronic device 702 may process 1510 another RPS parameter based on prev=1. In one instance, processing the positive RPS parameter may involve employing RPS_deltaPoc(k)=value+1+prev. In this instance, RPS_deltaPoc(k) would equal a value (e.g., relative value of 0) plus 1 plus prev (1). In other words, RPS_deltaPoc(k)=2. Thus, in this example, the positive RPS parameter generated is 2. Additionally, the generated RPS index values for the current picture is [−2, −4, 2].

Once the RPS index values are obtained, the electronic device 702 may decode 1512 the current picture. For example, the current picture may use the generated RPS index values for decoding.

In another example, suppose that the RPS has index values of [−4, −6, 4]. Here, −4 would be obtained as the negative relative RPS parameter. The index value may be initialized to 3, or to the smallest absolute value of the negative RPS index values minus 1. In other words, prev=|−4|−1=3. Processing a positive RPS parameter value would result in an RPS index value of 4. Thus, in this example, the set of RPS index values would be [−4, −6, 4].

Figure 16:
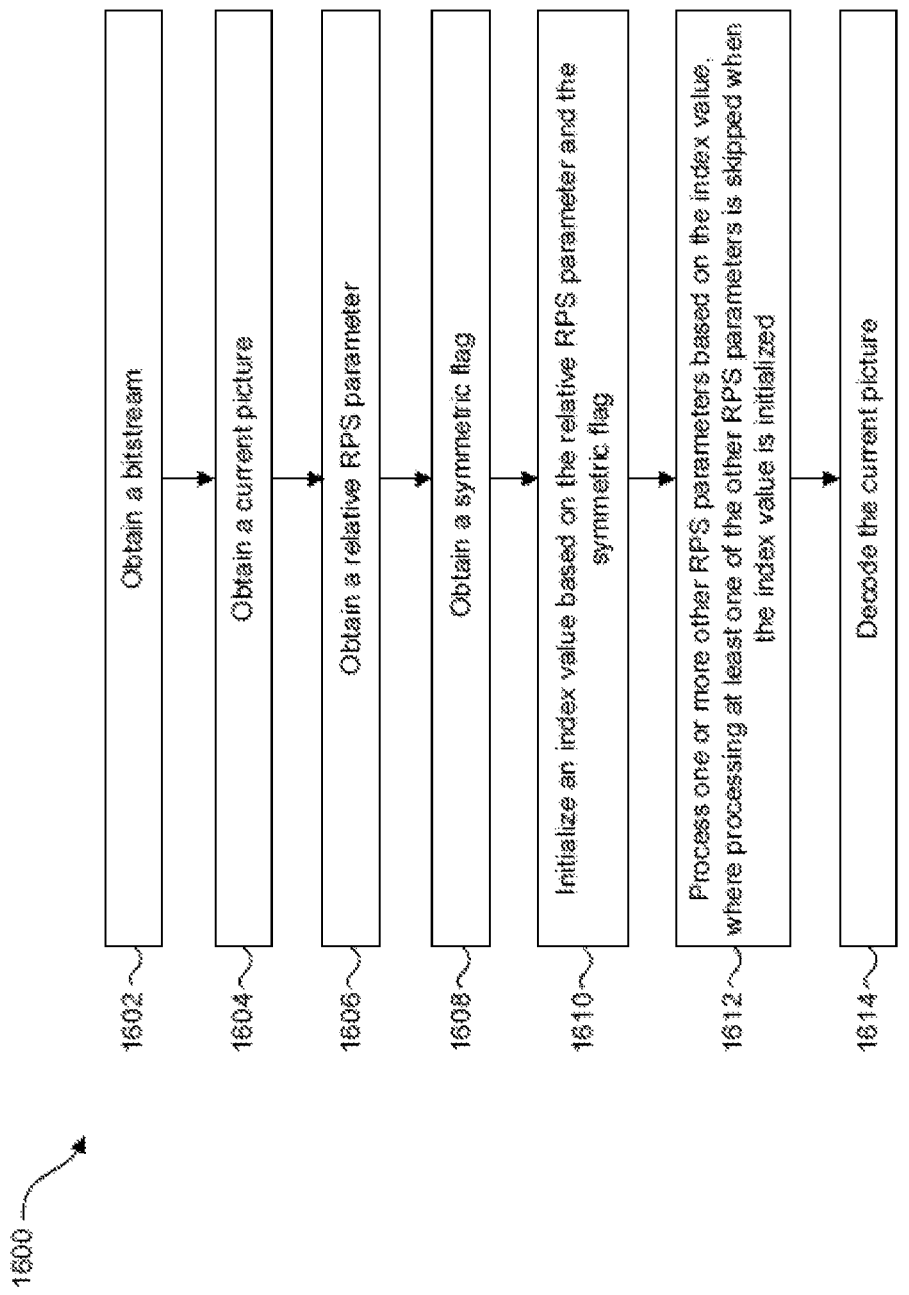
FIG. 16 is a flow diagram illustrating another more specific configuration of a method decoding a picture on an electronic device.

FIG. 16 is a flow diagram illustrating another more specific configuration of a method 1600 for decoding a picture on an electronic device 702. The electronic device 702 may obtain 1602 a bitstream, obtain 1604 a current picture and obtain 1606 a relative RPS parameter as discussed previously in connection with FIG. 14.

The electronic device 702 may obtain 1608 a symmetric flag. In some configurations, the symmetric flag may be the same or similar to the symmetric flag discussed previously. For example, the symmetric flag may indicate that the relative negative RPS parameter corresponds to the positive RPS parameter. For instance, given a set of RPS index values [−2, −6, 2, 4], the symmetric flag may indicate that the index value of −2 corresponds to the index value of 2.

Additionally, The symmetric_flag may be sent in a bitstream 714 to indicate if the first positive RPS index value can be initialized with a negative RPS index value. For example, the symmetric flag may indicate that the index value should be initialized to the smallest absolute value of negative RPS_deltaPoc values. Alternatively, the symmetry flag may indicate not initializing the index value to the smallest absolute value of negative RPS_deltaPoc values. In this case, the index value may be initialized to zero.

The electronic device 702 may initialize 1610 an index value based on the relative negative RPS parameter and the symmetric flag. As one example, Listing (15) below illustrates one approach of initializing 1610 an index value based on the relative negative RPS parameter and the symmetric flag. Modifications to the syntax in accordance with the systems and methods disclosed herein are denoted in bold.

Listing (15)

```
prev = 0;
For (j=0; j < num_negative_pics; j++){
    value = read( ) ;
    RPS_deltaPoc(j) = prev − value −1;
    prev = RPS_deltaPoc(j);
    ...
}
If (num_positive_pics > 0) {
    symmetric_flag = read( );
    if (symmetric_flag == true) {
        RPS_deltaPoc(num_negative_pics) =
        (smallest absolute value of negative RPS_deltaPoc) ;
    }
    prev = 0;
    For (j=0; j < num_positive_pics; j++){
        k = num_negative_pics+ j;
        if (j>0 || !symmetric_flag) {
            value = read( ) ;
            RPS_deltaPoc(k) = value + 1 + prev ;
        }
        prev = RPS_deltaPoc(k);
        ...
}
```

In one configuration of Listing (15), RPS_deltaPOC(num_negative_pics−1) stores the negative RPS index values. RPS_deltaPOC(num_negative_pics) to RPS_deltaPOC(num_negative_pics+num_positive_pics−1) stores the positive RPS index values. In this case, RPS_deltaPoc(num_negative_pics) above stores the first positive RPS index value. In other words, RPS_deltaPoc(num_negative_pics) refers to the first positive RPS index value. First, the electronic device 702 verifies that there is at least one positive RPS index value. Then the electronic device 702 determines whether there is a symmetric flag and if the flag is set to true. If the there is a symmetric flag set to true, the electronic device 702 initializes 1610 an index value based on the relative negative RPS parameter. Thus, the initialization of the index value is based on both the relative negative RPS parameter and the symmetric flag. In this configuration, the index value of RPS_deltaPoc(num_negative_pics) is initialized to the smallest absolute value of negative RPS_deltaPoc. For example, in the case of RPS index values [−8, −4, 4, 6], the first positive RPS index value may be initialized to 4, or the smallest absolute value of negative RPS_deltaPoc.

The electronic device 702 may process 1612 one or more other RPS parameters based on the index value. For instance, with a positive index value of 4, the electronic device 702 may be able to generate the second positive RPS index value of 6 in the example above. Further, the electronic device 702 may skip processing at least one of the other RPS parameters when the index value is initialized. In other words, when the first positive RPS index value is initialized, processing the positive RPS index values skips to the second positive RPS index value. For instance, in the example above, when the first positive RPS index value is initialized to 4, processing skips to the second positive RPS index value to generate a value of 6. Thus, in this example, the set of RPS index values [−8, −4, 4, 6] is obtained.

In some cases, where there is only one positive RPS index value, processing of the positive RPS index value may be skipped upon initialization of the index value. For example, for index values [−4, −8, 4], the electronic device 702 may receive the RPS index values [−4, −8] and derive reference index values of [−4, −8, 4] for the current picture being decoded. Thus, by skipping processing of the first positive reference picture in each RPS for each current picture, processing time may be reduced.

Once the RPS index values are obtained, the electronic device 702 may decode 1614 the current picture. For example, the current picture may use the processed RPS index values for decoding.

In another example, for the RPS index values [−2, −4, 2, 6], if the symmetric_flag is true, for the positive RPS_deltaPOC values, the first one must be equal to 2, as derived from the negative RPS index values. Other positive RPS index values may also be generated from the initialized index value. For instance, processing of the positive RPS index values may begin from the second positive RPS index value (e.g., 6) and may be based on the initialized index value of 2.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for decoding a video bitstream, the method comprising:
identifying a reference picture set from the video bitstream, wherein the video bitstream includes at least one flag associated with one of long and short term reference pictures of the reference picture set, wherein a current picture associated with the reference picture set is encoded in the video bitstream; and
decoding the current picture from the video bitstream using inter prediction with the reference picture set; and
parsing the at least one flag, wherein the at least one flag indicates keeping the at least one reference picture for decoding subsequent pictures.

2. The method of claim 1, wherein identifying the reference picture set is based on a slice header obtained from the video bitstream.

3. A method for encoding a video bitstream comprising:
generating a reference picture set for a current picture of the video bitstream, wherein the reference picture set includes long term and short term reference pictures;
encoding a block of the current picture using inter prediction with the reference picture set;
sending the reference picture set to the video bitstream;
setting and sending at least one flag, associated with one of the long term and short term reference pictures of the reference picture set, into the video bitstream, wherein the at least one flag indicates keeping the at least one reference picture for decoding subsequent pictures; and
sending the encoded block to the video bitstream.

4. The method of claim 3, wherein sending the reference picture set comprises sending the reference picture set in a slice header.

5. An electronic device for decoding a video bitstream, the electronic device comprising:
a processor;
a memory in electronic communication with the processor;
instructions stored in the memory for execution by the processor, the instructions when executed configuring the processor to:
identify a reference picture set from the video bitstream, wherein the video bitstream includes at least one flag associated with one of long term and short term reference pictures of the reference picture set, wherein a current picture associated with the reference picture set is encoded in the video bitstream; and
decode the current picture from the video bitstream using inter prediction with the reference picture set; and
parse the at least one flag, wherein the at least one flag indicates keeping the at least one reference picture for decoding subsequent pictures.

6. The electronic device of claim 5, wherein identifying the reference picture set is based on a slice header obtained from the video bitstream.

7. An electronic device for encoding a video bitstream, comprising:
a processor;
a memory in electronic communication with the processor;
instructions stored in the memory for execution by the processor, the instructions when executed configuring the processor to:
generate a reference picture set containing long term and short term reference pictures;
encode a block of a current picture using inter prediction with the reference picture set;
send the reference picture set to the video bitstream;
set and send at least one flag, associated with one of the long term and short term reference pictures of the reference picture set, into the video bitstream, wherein the at least one flag indicates keeping the at least one reference picture for decoding subsequent pictures; and send the encoded data to the video bitstream.

8. The electronic device of claim 7, wherein sending the reference picture set comprises sending the reference picture set in a slice header.

* * * * *